(12) United States Patent
Wang et al.

(10) Patent No.: US 12,466,748 B2
(45) Date of Patent: Nov. 11, 2025

(54) METHOD OF FLOCULATION USING A METAL-ORGANIC-FRAMEWORK

(71) Applicant: City University of Hong Kong, Hong Kong (CN)

(72) Inventors: Wenxiong Wang, Hong Kong (CN); Yiling Li, Hong Kong (CN)

(73) Assignee: CITY UNIVERSITY OF HONG KONG, Hong Kong (HK)

( * ) Notice: Subject to any disclaimer, the term of this patent is extended or adjusted under 35 U.S.C. 154(b) by 620 days.

(21) Appl. No.: 17/807,489

(22) Filed: Jun. 17, 2022

(65) Prior Publication Data
US 2023/0406736 A1   Dec. 21, 2023

(51) Int. Cl.
| | |
|---|---|
| C02F 1/52 | (2023.01) |
| C07F 11/00 | (2006.01) |
| B01D 21/01 | (2006.01) |
| C02F 103/00 | (2006.01) |
| C02F 103/08 | (2006.01) |

(52) U.S. Cl.
CPC .......... C02F 1/5272 (2013.01); C07F 11/005 (2013.01); *C02F 2103/007* (2013.01); *C02F 2103/08* (2013.01)

(58) Field of Classification Search
CPC ........ B01D 21/01; B01D 21/02; B01D 21/08; B01D 21/10; B01D 21/16; B01D 21/26; B01D 21/28; B01D 21/283; B01D 21/286; B01D 37/00; B01D 37/03; B01D 2311/12; B01D 2311/2642
USPC ....... 210/702, 703, 704, 705, 714, 719, 720, 210/723, 764
See application file for complete search history.

(56) References Cited

PUBLICATIONS

Fang et al., "Formation of carbonaceous and nitrogenous disinfection by-products from the chlorination of Microcystis aeruginosa", Science Direct, Water Research, vol. 44, pp. 1934-1940. 2010.

Fan et al., "Nanoscale Zero-Valent Iron Coated with Magnesium Hydroxide for Effective Removal of Cyanobacteria from Water", ACS Sustainable Chemistry & Engineering, vol. 6, pp. 15135-15142. 2018.

Li et al., "A Universal Method for Flocculating Harmful Algal Blooms in Marine and Fresh Waters Using Modified Sand", Environmental Science & Technology, vol. 47, pp. 4555-4562. Apr. 15, 2013.

Fan et al., "The effects of various control and water treatment processes on themembrane integrity and toxin fate of cyanobacteria", Sciencen Direct, Journal of Hazardous Matericals, vol. 264, pp. 313-322. 2014.

(Continued)

*Primary Examiner* — Allison G Fitzsimmons
(74) *Attorney, Agent, or Firm* — Heslin Rothenberg Farley & Mesiti P.C

(57) ABSTRACT

The present disclosure relates to a method of flocculation, wherein harmful cyanobacteria are flocculated via metal-organic framework, and wherein the metal-organic framework comprises chromium, which is environmentally friendly. Water-stable Cr(III)-based MOFs, structured as $NH_2$-MIL-101, remove harmful algal blooms, such as *Microcystis aeruginosa*, from natural water sources by promoting flocculation. $NH_2$-MIL-101(Cr) MOFs efficiently remove harmful algae from water without creating secondary pollution and without causing the harmful algae to release intracellular toxins.

22 Claims, 14 Drawing Sheets
(14 of 14 Drawing Sheet(s) Filed in Color)

(56) References Cited

PUBLICATIONS

Marsalek et al., "Multimodal Action and Selective Toxicity of Zerovalent Iron Nanoparticles against Cyanobacteria" ACS Publications, Environmental Science & Technology, vol. 46, pp. 2316-2323. Jan. 11, 2012.

Montemezzani et al., "Screening of potential zooplankton control technologies for wastewater treatment High Rate Algal Ponds", Science Direct, Algal Research, vol. 22, pp. 1-13. 2017.

Mu et al.. "Insight into Core—Shell Dependent Anoxic Cr(VI) Removal with Fe@Fe2O3 Nanowires: Indispensable Role of Surface Bound Fe(II)", Applied Matericals & Interfaces, vol. 7, pp. 1997-2005. 2015.

Pan et al., "Removal of cyanobacterial blooms in Taihu Lake using local soils. I. Equilibrium and kinetic screening on the flocculation of Microcystis aeruginosa using commercially available clays and minerals", Science Direct, Environmental Pollution, vol. 141, pp. 195-200. 2006.

Qi et al., "Prechlorination of algae-laden water: The effects of transportation time on cell integrity, algal organic matter release, and chlorinated disinfection byproduct formation", Science Direct, Water Research, vol. 102, pp. 221-228. 2016.

Qi et al., "Efficient Microcystis aeruginosa removal by moderate photocatalysisenhanced coagulation with magnetic Zn-doped Fe3O4 particles", Science Direct, Water Research, vol. 171, pp. 1-8. 2020.

Sengco et al., "Removal of red- and brown-tide cells using clay flocculation. I. Laboratory culture experiments with Gymnodinium breve and Aureococcus anophageffrens", Marine Ecology Progress Series, vol. 210, pp. 41-53. Jan. 26, 2001.

Sun et al., "Microorganisms-based methods for harmful algal blooms control: A review", Science Direct, Bioresource Technology, vol. 248, pp. 12-20. 2018.

Vandamme et al., "Flocculation as a low-cost method for harvesting microalgae for bulk biomass production", Trends in Biotechnology, vol. 31, No. 4, pp. 233-239. Apr. 2013.

Wan et al., "Current progress and future prospect of microalgal biomass harvest using various flocculation technologies", Science Direct, Bioresource Technology, vol. 184, pp. 251-257. 2015.

Wang et al., "Removal of Microcystis aeruginosa and control of algal organic matter by Fe (II)/peroxymonosulfate pre-oxidation enhanced coagulation", Science Direct, Chemical Engineering Journal, vol. 403, pp. 1-11. 2021.

Zhang et al.. "Use of an integrated metabolomics platform for mechanistic investigations of three commonly used algaecides on cyanobacterium, Microcystis aeruginosa", Science Direct, Journal of Hazardous Materials, vol. 367, pp. 120-127. 2019.

Li et al., "Toxicity assessment and underlying mechanisms of multiple metal organic frameworks using the green algae *Chlamydomonas reinhardtii* model", Science Direct, Environmental Pollution, vol. 291, pp. 1-9. 2021.

Zayed et al., "Chromium in the environment: factors affecting biological remediation", Kluwer Academic Publishers, Plant and Soil, vol. 249, pp. 139-156. 2003.

Li et al., "Influence of zeta potential on the flocculation of cyanobacteria cells using chitosan modified soil", Science Direct, Journal of Environmental Sciences, vol. 28, pp. 47-53. 2015.

Li et al., "Effective flocculation of harmful algae *Microcystis aeruginosa* by nanoscale metal-organic framework NH2-MIL-101(Cr)", Science Direct, Chemical Engineering Journal vol. 433, pp. 1-10. 2022.

US 12,466,748 B2

METHOD OF FLOCULATION USING A METAL-ORGANIC-FRAMEWORK

FIELD

The present disclosure relates generally to methods of flocculation using a metal-organic framework comprising chromium. More particularly, the present disclosure relates to a method of flocculation of harmful algae using a chromium metal-organic framework.

BACKGROUND

Harmful algal blooms (HABs) lead to reduced water quality and pose a risk to the health of both aquatic organisms and humans [1,2]. For example, the cyanobacterium *Microcystis aeruginosa* can produce algal organic matter and microcystin toxins in water, causing death to aquatic animals [2,3]. With the frequency of occurrence of HABs increasing, there is a need to develop more advanced and effective technologies to control HABs and treat water The use of flocculation followed by gravity sedimentation is one potential method for the removal of microalgae in natural water as, generally, *M. aeruginosa* are suspended and well-dispersed in aquatic environment due to their small size, similar density to water, and the presence of gas vacuoles [4, 5]. Flocculants allow algae to adhere to each other, generating flocs, and thereby facilitating the sedimentation and removal of algae [6]. Flocculation of harmful algae via traditional flocculant agents such as natural clay, polymeric flocculants, chitosan, and a variety of salts has been intensively studied [3, 7-11].

One example of a flocculant is the core-shell structured nanoscale zero-valent iron (NZVI), which is magnesium hydroxide ($Mg(OH)_2$) coated NZVI, and was developed for sedimentation of cyanobacterial cells from water [12]. The $Mg(OH)_2$ coating could protect the NZVI cores from breaking in water solution, reducing the toxic effects of NZVI to cyanobacterial cells. Another example of a flocculant is the modified sand and amino-rich polyamidoamine dendrimer coated magnetic iron oxide nanoparticles ($Fe_3O_4$ MNPs) [13, 14]. However, these flocculants have low efficiencies and/or required long processes to remove harmful algae. Moreover, some materials are corroded in water and inherently toxic, which results in secondary pollution, and thus are not suitable for use as a flocculant [15, 16]. In addition, some flocculants induce cell lysis of the microbe, e.g., cyanobacteria, which results in the release of intracellular toxins, and therefore are also not suitable for use in natural water sources without a further process to treat the water [12, 17].

Therefore, there is a need to develop a flocculant that is environmentally friendly (i.e., water-stable and not inherently toxic) and does not cause toxins within the HABs to be released into the water upon treatment.

The present disclosure is directed to overcoming these and other deficiencies in the art.

SUMMARY

In an aspect, provided is a method of flocculation, including adding a metal-organic framework to an aqueous solution, wherein the metal-organic framework includes chromium, and wherein the aqueous solution includes a microbe. In an example, the metal-organic framework includes MIL-101(Cr). In another example, the metal-organic framework includes an amine-functionalized MIL-101(Cr). In still another example, the metal-organic framework is $NH_2$-MIL-101(Cr).

In a further example, adding a metal-organic framework to an aqueous solution includes a sufficient mass of metal-organic framework to create a local concentration of aqueous metal-organic framework of from about 5 mg/L to about 50 mg/mL for from about 30 minutes to about 360 minutes.

In yet another example, the aqueous solution includes a freshwater source, a saltwater source, or a brackish water source. In a further example, the aqueous solution includes a freshwater source. In still a further example, the freshwater source is a pond, a lake, or a reservoir.

In yet another example, the microbe is selected from an algae, a bacterium, a fungus, an archaea, a protozoan, and a virus. In another further example, the microbe is a bacterium. In still another further example, the bacterium is a cyanobacterium. In yet another further example, the cyanobacterium is *Microcystis aeruginosa*. In another example, the microbe is an algae. In still another example, the algae is *Chlamydomonas reinhardtii* or *Chlorella pyrenoidosa*. In yet another example, the algae is *Chlamydomonas reinhardtii*. In a further example, the algae is *Chlorella pyrenoidosa*.

In still a further example, the aqueous solution includes a saltwater source or a brackish water source. In yet a further example, the aqueous solution has an average salinity of from about 1.5% to about 3%. In another further example, the microbe is selected from an algae, a bacterium, a fungus, an archaea, a protozoan, and a virus. In still another further example, the microbe is a bacterium. In yet another further example, the bacterium is a cyanobacterium. In another example, the cyanobacterium is *Microcystis aeruginosa*.

BRIEF DESCRIPTION OF THE FIGURES

The patent or application file contains at least one drawing executed in color. Copies of this patent or patent application publication with color drawings will be provided by the Office upon request and payment of the necessary fee.

Some examples of the present disclosure will now be explained, with reference to the accompanied drawings, in which:

(FIG. 1A) PXRD pattern; (FIG. 1B) FTIR spectrum; and (FIG. 1C) SEM image;

(FIG. 2A) two series of photographs showing induced removal of *M. aeruginosa* with the addition of 20 mg/L $NH_2$-MIL-101(Cr) for 0, 0.5, 1.5, 3, and 6 hours (initial cell concentration $3\times10^6$ cell/mL); (FIG. 2B) two series of light micrographs showing the flocculation of *M. aeruginosa* over time with the addition of $NH_2$-MIL-101 (Cr) compared to a control group without addition of $NH_2$-MIL-101(Cr);

(FIG. 3D) *M. aeruginosa* cell numbers in the suspensions of the native algal suspension and those after MOFs treatment; (FIG. 3E) corresponding algal removal efficiency under MOFs treatment over seven days; and (FIG. 3F) *M. aeruginosa* cell removal via Cr-based MOF in river water samples;

(FIG. 7B) after treatment with various metal-organic framework loading doses, and (FIG. 7C) during 3 h processes immediately after addition of 20 mg/L metal-organic frameworks. Control: *M. aeruginosa* cells without metal-organic frameworks;

(FIG. 8B) fluorescence signal distributed along the white dashed line in (FIG. 8A)—Merge, red line and green line represent algal autofluorescence and $NH_2$-MIL-101(Cr)-FITC, respectively;

DETAILED DESCRIPTION

Figure 1A:
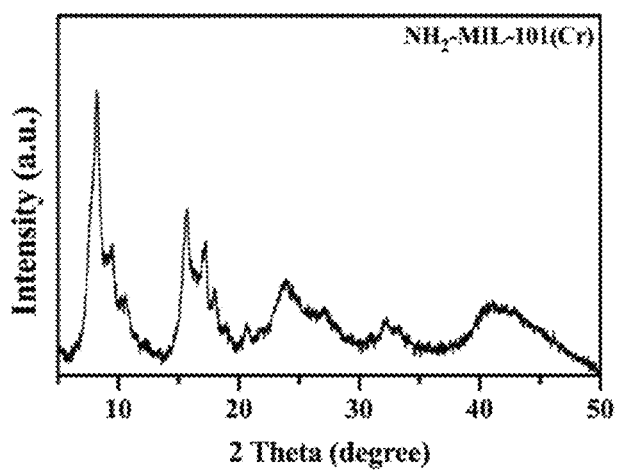
FIGS. 1A-1C depict various characteristics of $NH_2$-MIL-101(Cr)

According to an aspect of the present disclosure, there is provided a method of flocculation, including adding a metal-organic framework to an aqueous solution, wherein the metal-organic framework includes chromium, and wherein the aqueous solution includes a microbe.

For the purposes of this disclosure, a "metal-organic framework," or "MOF," means a compound including one or more metal ions or clusters of metal ions coordinated to one or more organic ligands to form a crystalline porous material [18].

MOFs may be used in multiple applications, as an adsorbent or a photocatalyst, such as for environmental remediation [19-22], due to their high surface area, physical stability, well-designed structure, and facile post-synthetic modification [23, 24]. MOFs result in varying degrees of attachment, hetero-aggregation, and co-precipitation with algal cells [25].

A non-limiting example of a metal-organic framework is a chromium metal-organic framework. Non-limiting examples of chromium metal-organic frameworks include MIL-53(Cr), MIL-100(Cr), and MIL-101(Cr). MIL-101(Cr) is a three-dimensional chromium terephthalate-based porous material with the molecular formula $[Cr_3(O)X(BDC)_3(H_2O)_2] \cdot nH_2O$ (n~25), wherein BDC=benzene-1,4-dicarboxylate and X=(OH or F) [26]. MIL-101(Cr) was directly synthesized with $Cr(NO_3)_3 \cdot 9H_2O$ and $H_2BDC$ under conventional hydrothermal conditions at 150° C. for 12 h [27]. In MIL-101(Cr), terephthalate ligands and trimeric Cr(III) octahedral clusters formed the super tetrahedral building unit (ST). The trimers located at the vertices of ST, while the six edges of ST were occupied by organic ligands. The vertices connect different STs, forming a "corner-sharing" 3-D tetrahedra with an augmented Mobil Thirty-Nine (MTN) zeolite topology [26]. MIL-101 (MIL, Material Institute Lavoisier) shows a rigid zeotype cubic structure, possessing extra-large pore sizes of 30-34 angstroms and large surface areas of $599\pm300$ m2/g [26].

Further, a metal-organic framework may be functionalized by the addition of different chemical groups. A non-limiting example of a chemical group that may be used to functionalize metal-organic frameworks is an amine.

In an example of the present disclosure, the metal-organic framework is an amine-functionalized MIL-101(Cr). Functionalization is the process of adding new functions, features, capabilities, or properties to a material by changing the surface chemistry of the material. For example, something that is amine-functionalization has been modified with an amine group that confers one or more new functions, features, capabilities, and/or properties. A non-limiting example of an amine-functionalized MIL-101(Cr) is $NH_2$-MIL-101(Cr). $NH_2$-MIL-101(Cr) could be obtained either by post-synthetic modification of parent pristine MIL-101 (Cr) or directly synthesized using $NH_2$-BDC (organic ligand containing amine groups) and $Cr(NO_3)_3 \cdot 9H_2O$ [28]. In the case for water decontamination, chemical grafting of amine was the most popular and commonly used functionalization strategy [29]. Amine-functionalized MOFs possess the properties of pristine MOF together with the properties derived from amine groups, and consequently can show improved properties.

Through introducing the amino groups ($NH_2$—) into the organic frames of the MIL-101 (Cr) lattice, $NH_2$-MIL-101 (Cr) could be obtained, which retains features of MIL-101 [27]. Cr(III) is environmentally friendly and may be a micronutrient for organisms [30, 31]. Moreover, Cr(III) may be immobile and precipitate or sorb onto various organic and inorganic materials in neutral and alkaline conditions.

In an example, adding a metal-organic framework to an aqueous solution includes adding a sufficient mass of metal-organic framework to create a local concentration of aqueous metal-organic framework of from about 5 mg/L to about 50 mg/L, including any and all ranges and subranges therein, for from about 30 minutes to about 360 minutes, including any and all ranges and subranges therein.

In an example, an aqueous solution may include a freshwater source, a saltwater source, or a brackish water source. In a further example, the freshwater source may be a river, a pond, a lake, or a reservoir. Average salinity of an aqueous solution may be from about 1.5% to about 3%, including any and all ranges and subranges therebetween.

For the purposes of this disclosure, a "microbe" means an algae, a bacterium, a fungus, an archaea, a protozoan, or a virus. A non-limiting example of a bacterium is a cyanobacterium, such as $M.$ $aeruginosa$. Non-limiting examples of an algae are green algae $Chlamydomonas$ $reinhardtii$ and $Chlorella$ $pyrenoidosa$.

The inventors have surprisingly found that water-stable MOFs can be used as efficient, and environmentally friendly, flocculants for the removal of harmful HABs. In an example, a water-stable Cr(III)-based MOF, structured as $NH_2$-MIL-101, may be used to remove cyanobacterium $Microcystis$ $aeruginosa$ from a water source by flocculation. In accordance with aspects of the present disclosure, $NH_2$-MIL-101(Cr) exhibit algal removal performance, with >95% flocculation efficiency against $M.$ $aeruginosa$ within 1.5 h at 30 mg/L dosage or 3 h at 20 mg/L dosage. $NH_2$-MIL-101(Cr) exhibits algal flocculation capacity over a wide range of pH conditions and cell densities. As disclosed herein, algal removal capacity of $NH_2$-MIL-101(Cr) is superior to commercial flocculants such as ferric chloride and chitosan. Furthermore, $NH_2$-MIL-101(Cr) exhibited algal removal efficiencies of 97% after 24 h in creek water, confirming the performance of the MOFs under natural conditions. Without being limited by any particular mechanism of action, algal removal capacity of the MOFs may be attributed to the adhesion of aggregated MOFs to the algal surface and co-precipitation with algae from the water solution. $NH_2$-MIL-101(Cr) showed much higher algal removal efficiency compared with MIL-101(Cr), emphasizing the contribution of amine groups in algae-MOFs attachment and co-aggregation.

EXAMPLES

Preparation and Characterization of MOFs

The $NH_2$-MIL-101(Cr) was synthesized using a previously described HF-free hydrothermal method [27]. For example, 0.8 g of chromic nitrate hydrate ($Cr(NO_3)_3 \cdot H_2O$), 0.36 g of 2-aminoterephthalic acid ($NH_2$-BDC), and 0.2 g of sodium hydroxide were added into 15 mL of MilliQ water. After stirring for 5 min, the mixture was transferred to a Teflon-lined stainless-steel autoclave and heated at 150° ° C. for 12 h, yielding the $NH_2$-MIL-101(Cr) particles. The product was collected by centrifugation and subsequently washed with dimethylformamide to remove 2-aminoterephthalic acid residues, and then dried. The synthesis method of MIL-101(Cr) is similar to that of $NH_2$-MIL-101(Cr), with $NH_2$-BDC replaced by terephthalic acid. The successful synthesis of $NH_2$-MIL-101(Cr) and MIL-101(Cr) were characterized by powder X-ray diffraction (XRD) measurement. The morphology and size of the MOFs particles were characterized by scanning electron microscopy (SEM, Carl Zeiss EVO MA10, USA). Chemical properties of the MOFs were characterized using Fourier transform infrared (FTIR) spectra in the range of 500-4000 $cm^{-1}$ (FT-IR, IRAffinity-1S spectrometer). Zeta potential and hydrodynamic size were measured by dynamic light scattering (DLS) on a Malvern Zetasizer Nano-Zsat (UK).

Algal Cultivation and Flocculation $Microcystis$ $aeruginosa$ (strain FACHB-905) was obtained from the Institute of Hydrobiology, Chinese Academy of Sciences. Cells were cultured in sterilized BG-11 medium at 25° C. under illumination (2800 1x) on a of 16 h/8 h light/dark cycle.

Stock solutions of $NH_2$-MIL-101(Cr) were prepared in distilled water and refreshed at the beginning of every week. For the flocculation experiment, $NH_2$-MIL-101(Cr) was added into the algal suspension and the mixtures were placed on an orbital shaker and shaken at 85 rpm. To investigate the performance of $NH_2$-MIL-101(Cr) for algal flocculation, different dosages of $NH_2$-MIL-101(Cr) were added into the algal suspension with final concentrations of 0, 5, 10, 20, 30, and 50 mg/L. The pH values of initial BG11 medium were measured with a pH meter (FiveEasy Plus, Mettler Toledo). Minor variations (pH±0.1) were noticed for the BG11 medium with different $NH_2$-MIL-101(Cr) dosage. The impacts of algal cell density on $NH_2$-MIL-101(Cr) flocculation capacity were evaluated with a wide range of initial algal density (2-40×$10^6$ cells/mL) while $NH_2$-MIL-101(Cr) dosage (20 mg/L) and pH value (pH=7.1±0.1) were kept constant. To evaluate the influence of pH environments on algal flocculation, BG11 solutions with pH values ranging from 4.0 to 10.0 were prepared by adding 0.1 mol/L HCl or 0.1 mol/L NaOH. The impact of initial pH on algal flocculation was evaluated at $NH_2$-MIL-101(Cr) dosage of 20 mg/L. At the end of the desired flocculation time, algal samples were taken from the middle of the water column. Cell counts of $M.$ $aeruginosa$ were performed with a flow cytometer (BD FACSAria™ III sorter, USA) immediately after algal sampling. Microscopy images were obtained using a Nikon Eclipse Ti2 microscope. A 7-day flocculation study was conducted to evaluate the long-term flocculation capacities of $NH_2$-MIL-101(Cr). $NH_2$-MIL-101(Cr) was added to the algal suspensions to a final concentration of 20 mg/L, and the test vials were incubated for 7 days under the same condition for algal cultivation. Water samples were collected for algal number counting every day in one week. Half of the collected samples were subjected to flow cytometry for algal cell number counting, while the other half were used for residual chromium concentration determination. To investigate the escape of $M.$ $aeruginosa$ from the flocs, after 3 h flocculation assay, the suspensions were discarded, and same volumes of fresh BG11 medium were carefully added in the tested vials. The tested vials were then incubated for 7 days under the same condition for algal cultivation. Samples were collected at fixed time for algal cell number counting by flow cytometry. All flocculation assays were performed in triplicate.

Zeta Potential Analysis

The influence of pH values on the zeta potential of $M.$ $aeruginosa$ cells (6×$10^6$ cell/mL) and $NH_2$-MIL-101(Cr) (20 mg/L) was evaluated. For zeta potential measurements during the flocculation process, $NH_2$-MIL-101(Cr) was added to the algal suspensions to a final dosage of 20 mg/L. At the desired time intervals (0 min, 15 min, 30 min, 60 min, 90 min, and 180 min), algal samples were collected for zeta potential analysis by a ZetaPlus (Brookhaven Instruments Co.). The hydrodynamic diameter of $NH_2$-MIL-101(Cr) was also measured over the 3 h experimental period.

Aggregation and Sedimentation of $NH_2$-MIL-101(Cr)

The stock solution of MOFs was sonicated for 10 min and then added to the BG11 medium to achieve the target initial concentrations. The dynamic sedimentation process of the MOFs was determined using UV-vis spectrophotometer [32]. Optical absorbance of $NH_2$-MIL-101(Cr) at 385 nm was monitored every 10 min for 180 min.

Algal Viability and Membrane Integrity Evaluation

After MOFs treatment, algal samples were collected from the test suspensions. Membrane integrity evaluation was conducted using propidium iodide (PI) staining [25]. Cell viability was evaluated by monitoring the esterase activity using fluorescein diacetate (FDA). After incubation of $M.$ $aeruginosa$ cells with FDA, $M.$ $aeruginosa$ cells were incubated with FDA and subjected to flow cytometry for FDA fluorescence determination. Membrane integrity and esterase activity results of $M.$ $aeruginosa$ cells after MOFs treatment were expressed as the percentages between the treatment groups and control.

Chromium Determination

Released chromium in the algal culture medium was determined by Inductively Coupled Plasma-Mass Spectrometry (ICP-MS, NexION, 300×, Perkin-Elmer, USA) [25]. Briefly, samples were centrifuged at 5000 g for 30 min, and the supernatants were collected, filtrated using a 0.22 μm Millipore filtration membrane. For further ICP-MS analysis, the filtration was digested by nitric acid and hydrogen peroxide.

Statistical Analysis

Statistical analysis was performed using GraphPad Prism 8.0 software (GraphPad Software Inc.). Data from different treatments were subjected to one-way ANOVA analysis. Significant difference was obtained when $p<0.05$.

Characterization of MOFs

Figure 1B:
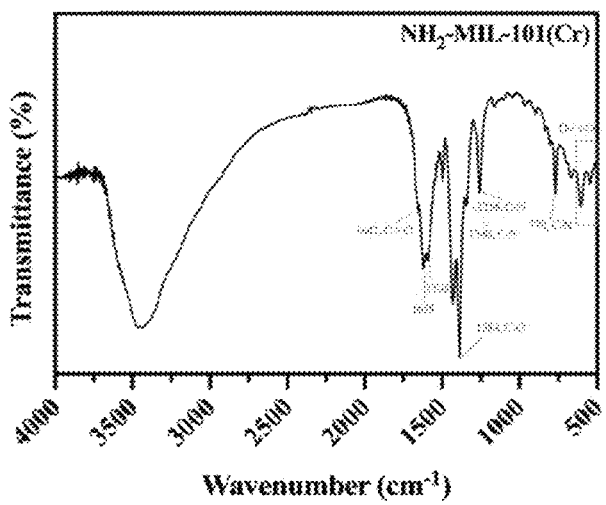
Figure 1C:
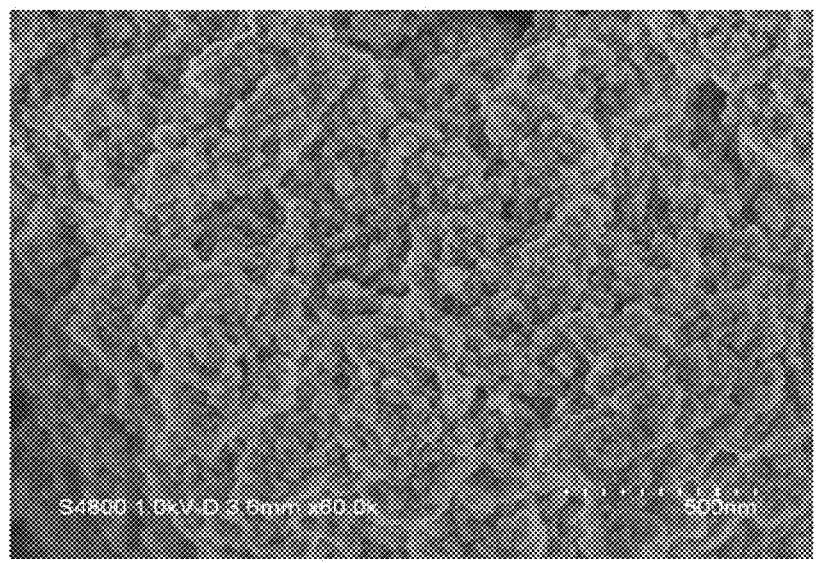

As shown in FIGS. 1A-1C, the metal-organic frameworks were characterized by PXRD (FIG. 1A), FTIR (FIG. 1B), and SEM (FIG. 1C). In FIG. 1A, the PXRD patterns of the MOFs confirm synthesis of the targeted MOFs [32, 33], and the diffraction peaks suggest the targeted MOFs are of high crystallinity and purity. Similarly, in FIG. 1B, the FTIR data of the resulting $NH_2$-MIL-101(Cr) are presented. In FIG. 1C, the morphology of $NH_2$-MIL-101(Cr) crystals is presented as was observed by SEM, which shows that $NH_2$-MIL-101(Cr) crystal has an octahedral morphology with a crystal size of less than 50 nm.

Removal Performance of $M.$ $aeruginosa$ by $NH_2$-MIL-101 (Cr)

Affecting Factors for Removal Efficiency

Figure 2A:
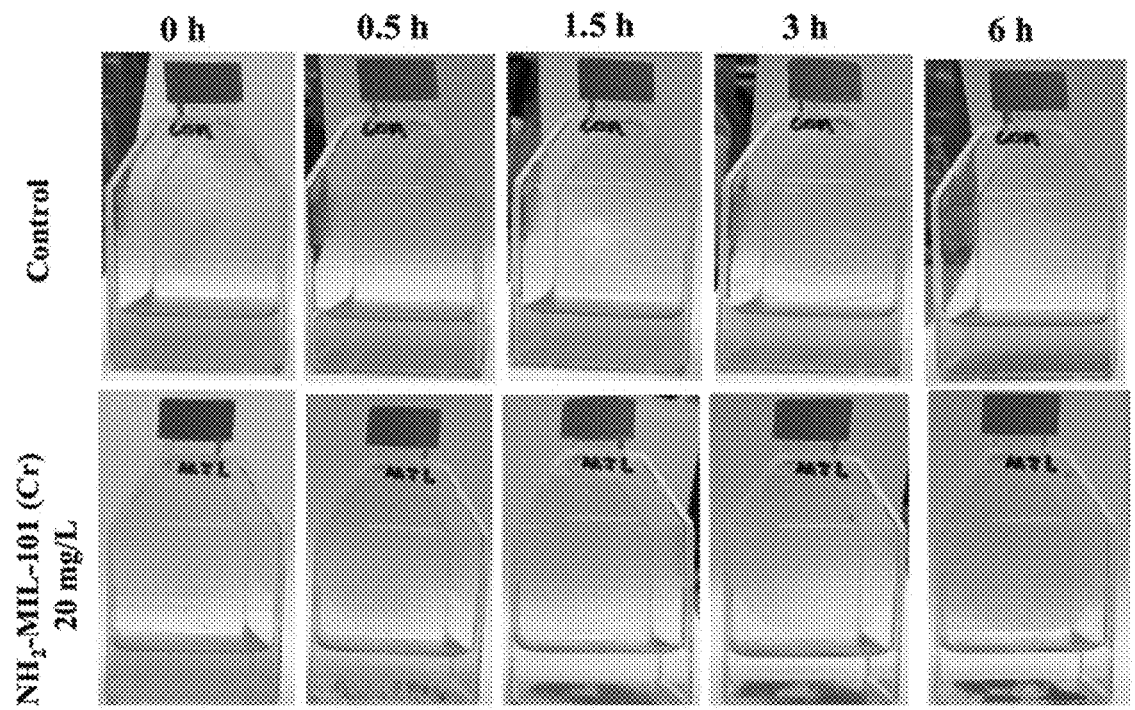
FIGS. 2A and 2B depict images of *M. aeruginosa* with and without addition of a metal-organic framework $NH_2$-MIL-101(Cr)
Figure 2B:
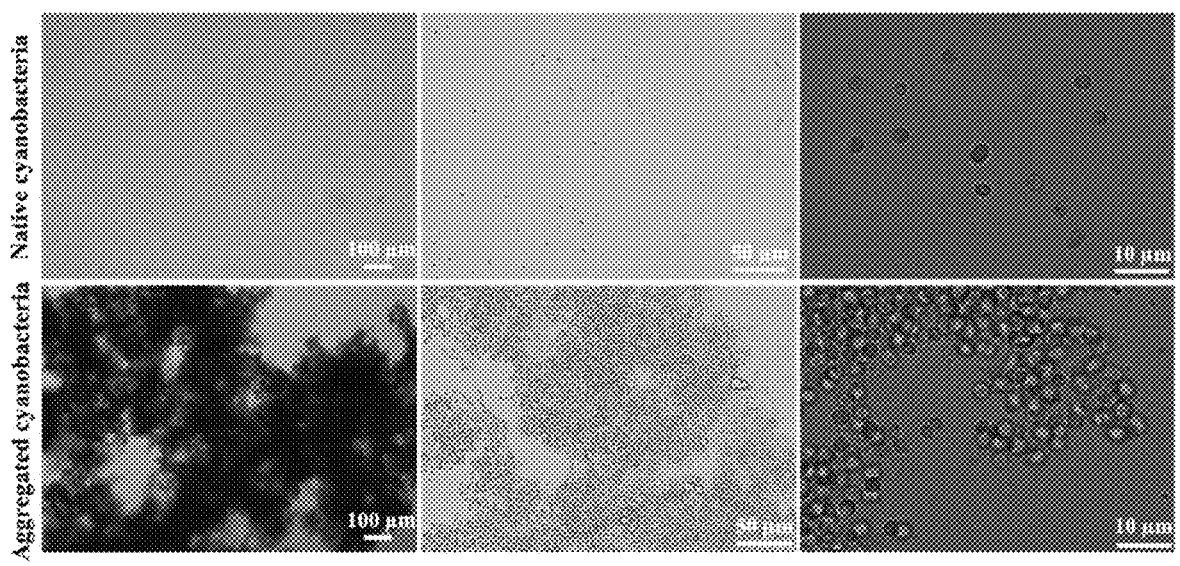

FIG. 2 depicts images of $M.$ $aeruginosa$ with and without addition of the metal-organic framework $NH_2$-MIL-101(Cr). For example, in FIG. 2A it can be seen that the addition of $NH_2$-MIL-101(Cr) efficiently induced the removal of $M.$ $aeruginosa$. Green agglomerates (corresponding to cyanobacterial chlorophyll) were formed within a few minutes of $NH_2$-MIL-101(Cr) dosing, followed by progressive cyanobacterial settlement. Green aggregations were visible at the bottom of the test vials within 0.5 h of $NH_2$-MIL-101(Cr) treatment. The water became much clearer over the timespan of the experiment as $M.$ $aeruginosa$ cells gradually accumulated on the bottom, and nearly no green cyanobacterial cells remained in the supernatant after 1.5 h. As shown by the light micrographs in FIG. 2B, $M.$ $aeruginosa$ cells were evenly suspended in the algal culture medium (BG11 medium) in a unicellular state at 2-3 μm in diameter, without tendency to aggregate. Nevertheless, the addition of $NH_2$-MIL-101(Cr) facilitated the aggregation of the well-dispersed $M.$ $aeruginosa$ cells, resulting in aggregates with diameters up to a few millimeters.

Figure 3A:
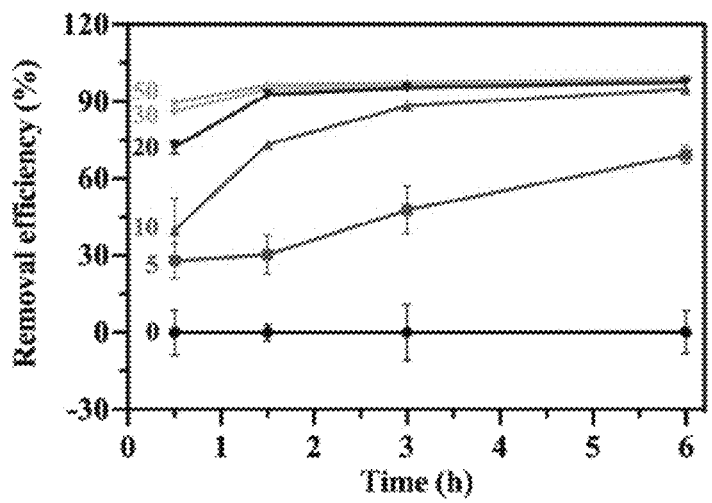
FIGS. 3A-3F depict the effects of Cr-based MOFs at different (FIG. 3A) dosages (mg/L) (experimental conditions: cell density $6\times10^6$ and pH 7.1±0.1), (FIG. 3B) *M. aeruginosa* cell densities (experimental conditions: pH value 7.1±0.1 and flocculant concentration 20 mg/L), and (FIG. 3C) pH values of algal solution on algal removal (experimental conditions: cell density $6\times10^6$ and flocculant concentration 20 mg/L)
Figure 3B:
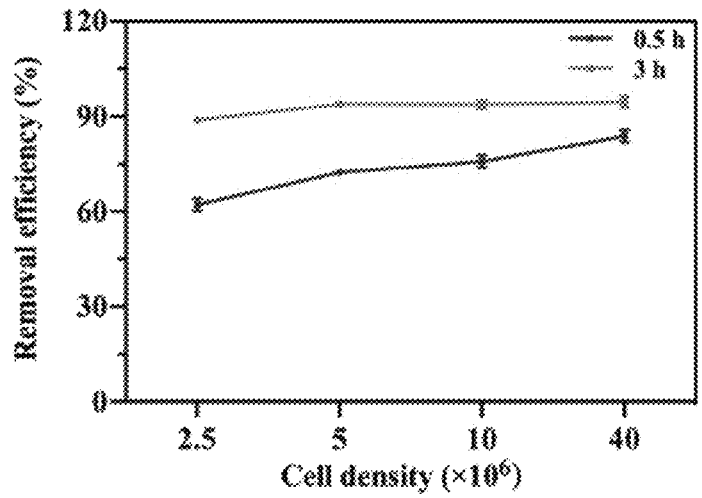

In addition to the preliminary visual observation of the algae removal performance of the Cr(III)-based MOFs, the algal removal efficiency was accurately evaluated through monitoring the freely suspended $M.$ $aeruginosa$ cell numbers after $NH_2$-MIL-101(Cr) treatment using flow cytometry (FIGS. 3A-3F). The $NH_2$-MIL-101(Cr) MOFs, under different experimental conditions, including various $NH_2$-MIL-101(Cr) dosages, algal cell densities, and pH values, were applied for the removal of $M.$ $aeruginosa$. The influence of MOFs dosage on the removal efficiency of $M.$ $aeruginosa$ was assessed at MOFs concentrations ranging from 5 to 50 mg/L while other conditions were kept constant (FIG. 3A and Table 1). The results demonstrate that $M.$ $aeruginosa$ removal by the MOFs occurred in a time- and concentration-dependent manner. $NH_2$-MIL-101(Cr) at 10 mg/L exhibited 40, 73, 88, and 95% removal ratio at the contact time of 0.5, 1.5, 3, and 6 h, respectively. $NH_2$-MIL-101(Cr) dosing concentration of 20 mg/L and above gave flocculation activities as high as 72, 93, 95, and 98% after 0.5, 1.5, 3, and 6 h, respectively. When the MOFs dosage further increased to 50 mg/L, 90% of the cells were removed from the cyanobacterial suspension within 0.5 h. After 6 h, hardly any cells (≤1%) were detected in the suspensions. For algal bloom cases in natural aquatic environments, different harmful algal concentrations might occur. The effectiveness of algal removal by $NH_2$-MIL-101(Cr) over a wide range of algal densities from 2.5 to $40\times10^6$ cells/mL was therefore assessed (FIG. 3B). The algal removal efficiency of the MOFs increased as the initial algal density increased, showcasing 62, 72, 76, and 84% for initial algal density of 2.5, 5, 10, and $40\times10^6$ cells/mL after 0.5 h flocculation, respectively. Moreover, the algae removal efficiencies ranging from 88% to 95% were achieved at contact time of 3 h. The higher algal density facilitated the removal efficiency by increasing the frequency of the algae-algae and algae-MOFs encounters.

TABLE 1

Removal efficiencies of $M.$ $aeruginosa$ cells by $NH_2$-MIL-101 (Cr) Cell removal efficiency (%)

| Time (h) | 5 mg/L | 10 mg/L | 20 mg/L | 30 mg/L | 50 mg/L |
|---|---|---|---|---|---|
| 0.5 | 27.9 ± 6.8 | 39.9 ± 12.3 | 72.3 ± 2.7 | 86.3 ± 1.3 | 89.6 ± 0.8 |
| 1.5 | 30.3 ± 7.5 | 73.3 ± 2.2 | 92.7 ± 1.3 | 94.7 ± 0.5 | 96.3 ± 0.7 |
| 3.0 | 47.7 ± 9.3 | 88.3 ± 1.3 | 95.3 ± 0.2 | 96.1 ± 1.3 | 97.1 ± 0.7 |
| 6.0 | 69.3 ± 3.4 | 94.8 ± 0.3 | 97.6 ± 0.4 | 98.2 ± 0.5 | 99.2 ± 0.1 |

Figure 3C:
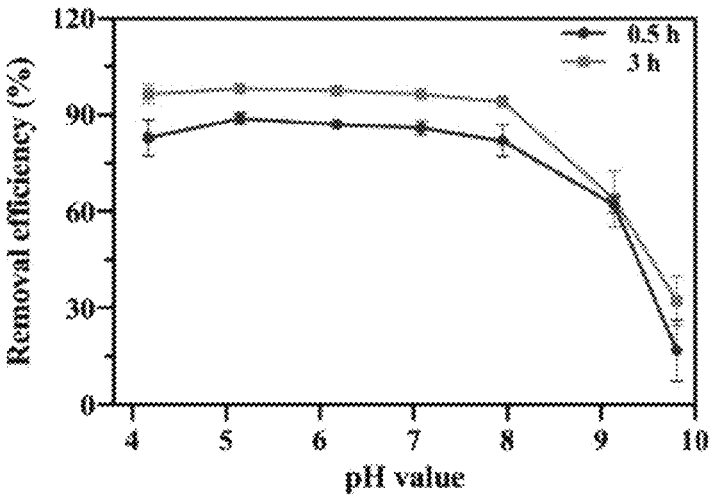

To assess the influence of pH values on the removal ratio of algae, experiments of $M.$ $aeruginosa$ removal via $NH_2$-MIL-101(Cr) were conducted with different pH values [11, 34]. As depicted in FIG. 3C, $NH_2$-MIL-101(Cr) kept flocculation efficiency of 94-98% as the pH values varied from 4.0 to 8.0.

Algal Re-Growth after MOFs Treatment

Figure 3D:
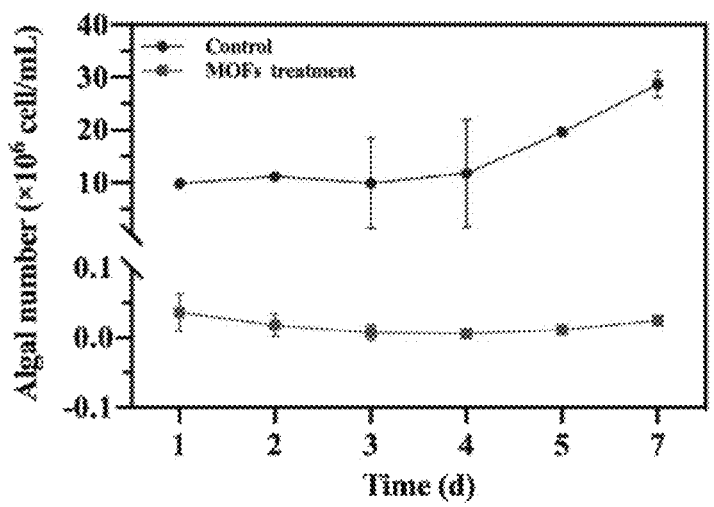
Figure 3E:
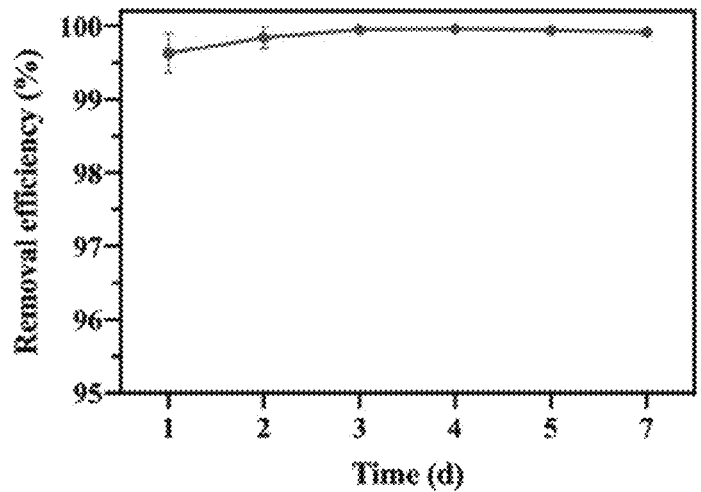
Figure 3F:
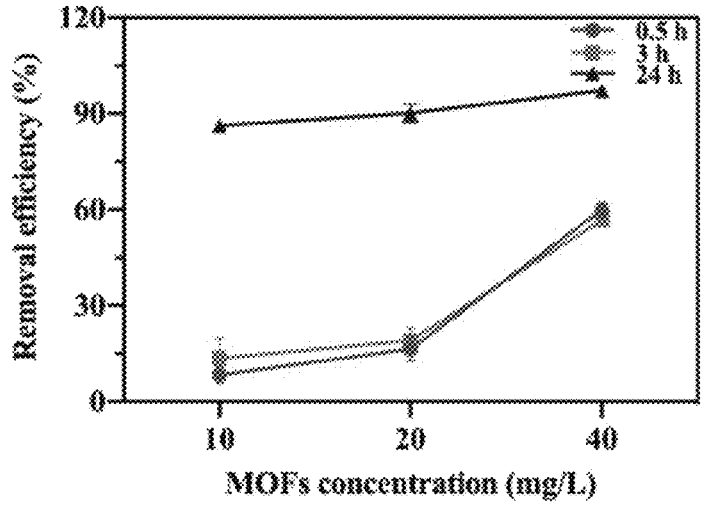

The regrowth of the live algal cells from the flocs was previously observed in some cases, which potentiate a second algal bloom [10]. To assess the long-term inhibition effect of the MOFs on the regrowth of $M.$ $aeruginosa$, the assay was extended to 7 days. Native cyanobacterial cells without any treatment and the aggregated cells after MOFs treatment were transferred to the cultivation environment used for algal culture. $M.$ $aeruginosa$ cells in the supernatant of algal suspension with and without MOFs treatment were collected and quantified for one week. The changes in the algal cell density in the supernatant of the solution and the corresponding algal removal efficiency in 7 days are illustrated in FIG. 3D. The native cyanobacteria were well-dispersed in the solution and began to grow gradually after the first 3-day adaptation period. Nevertheless, the aggregated $M.$ $aeruginosa$ stayed at the bottom of the culture bottles and the solution remained clear with no cell proliferation detected. The cell numbers in the control group increased from 10 to 29×10$^6$ cell/mL within 7 days, while the cell densities in the water solution under NH$_2$-MIL-101 (Cr) treatment kept below 4×10$^4$ cell/mL (FIG. 3D). No re-growth of *M. aeruginosa* cells was detected and high algal removal efficiencies (>99%) were maintained over the 7-day test period (FIG. 3E). NH$_2$-MIL-101(Cr) provided longer inhibition time on cyanobacterial growth than some other cyanobacterial treatment agents such as chitosan and cationic starch [10]. Moreover, the performance of the MOFs for harmful algal removal was tested in river water. As indicated in FIG. 3F, at contact time of 3 h, the removal rate of *M. aeruginosa* cells was only 10-20% with the MOFs dosage of 10 and 20 mg/L and reached to ~60% when MOFs dosage was 40 mg/L. Nevertheless, the algal removal ratio reached to 86%, 90%, and 97% with 10, 20, and 40 mg/L MOFs addition, respectively, after 24 h. Although higher dosage of the Cr(III)-based MOFs or longer contact time were needed to obtain >90% algae removal when the experiments were conducted in river water than that in artificial algal solution, NH$_2$-MIL-101(Cr) is still reliable for cyanobacterial removal in natural water samples, such as freshwater sources (e.g., river water, pond water, reservoir water, etc.), saltwater sources, and brackish water sources.

Therefore, NH$_2$-MIL-101(Cr) particles can be used to remove *M. aeruginosa* cells from a water source via flocculation. NH$_2$-MIL-101(Cr) provide a new and effective way for the removal of cyanobacteria.

Comparison Between NH$_2$-MIL-101(Cr) and Commercial Flocculants

Figure 4A:
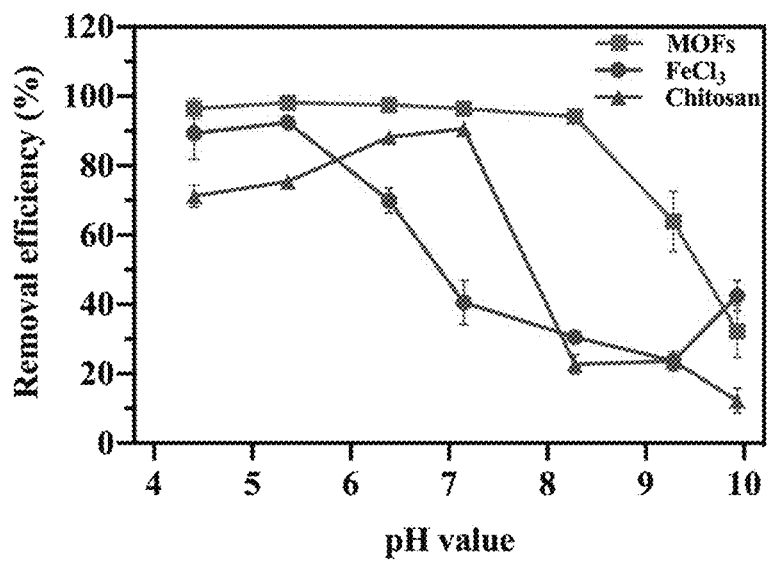
FIGS. 4A and 4B depict the removal performance of *M. aeruginosa* via $NH_2$-MIL-101(Cr), $FeCl_3$, and chitosan under (FIG. 4A) pH values of 4-10 (experimental conditions: flocculant concentration 20 mg/L, flocculation time 3 h, and cell density $6\times10^6$) and (FIG. 4B) cell densities of $2\text{-}40\times10^6$ (experimental conditions: flocculant concentration 20 mg/L, flocculation time 3 h, and pH value 7.11)
Figure 4B:
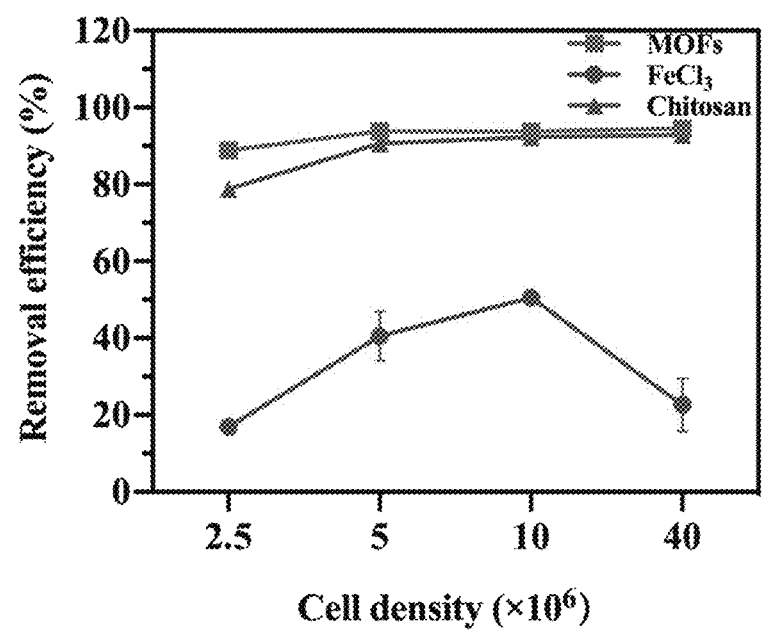

To further assess the efficiency of using NH$_2$-MIL-101 (Cr) to remove harmful algae, the algal removal performance of NH$_2$-MIL-101(Cr) was compared with other conventional flocculants, i.e., a representative inorganic flocculant, FeCl$_3$, and a representative organic polymer/polyelectrolyte flocculant, chitosan. As shown in FIGS. 4A-4B, a maximum flocculation efficiency of 90% was achieved at pH 4.4 and 5.4 for 20 mg/L FeCl$_3$. Further, increasing pH from 6 to 9 resulted in a gradually reduced flocculation ratio from 70% to 24%. For chitosan, the results indicated that it was only effective in acidic and neutral pH environments (pH≤7), with flocculation activity ranging from 71 to 91%. Once the pH value of the algae suspensions increased to higher than 7, chitosan lost its flocculation ability, showing flocculation ratio less than 20%. Nevertheless, NH$_2$-MIL-101(Cr) showed higher than 94% removal efficiency at pH≤8, and it could flocculate more than 64% of algae cells even at pH 9.3. Thus, compared with FeCl$_3$ and chitosan, NH$_2$-MIL-101(Cr) can be used for algal removal at a wider range of pH values. Moreover, NH$_2$-MIL-101(Cr) were able to remove higher amounts of algal cells than FeCl$_3$ and chitosan at the same experimental conditions (e.g., flocculation dosage, time, and pH value). Nanofer25 (a commercially available product including an aqueous dispersion of nanoparticles) can remove 50% of cyanobacteria at 50 mg/L in 24 h [2]. For NH$_2$-MIL-101(Cr), the 55% cell removal efficiency was reached after only 0.5 h at 10 mg/L MOFs dosing concentration. Thus, NH$_2$-MIL-101(Cr) particles can remove *M. aeruginosa* cells from water, and outperform numerous commercially available algal removal materials.

Stability Test of NH$_2$-MIL-101(Cr) in the Algal Culture Medium

Figure 5:
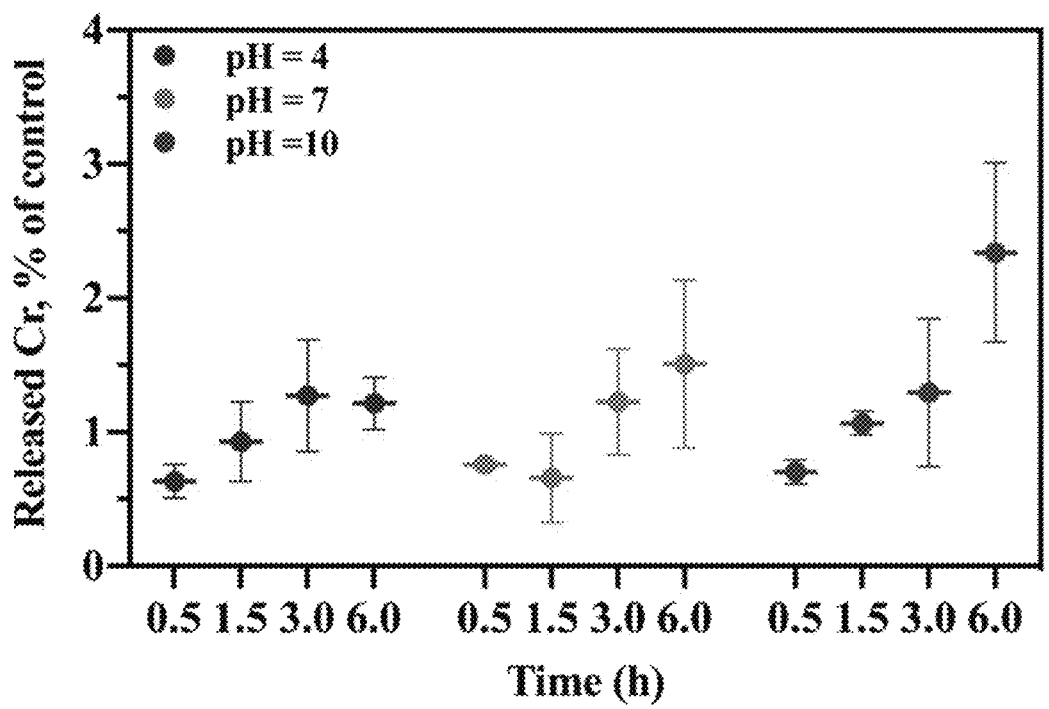
FIG. 5 depicts the released Cr from $NH_2$-MIL-101(Cr) into the BG11 medium at various pH after different incubation time.

Generally, MOFs have poor stability under humid and aqueous conditions, which hinders their efficiencies and potential applications in water treatment [35]. Further, coordinating anions are present in algal solution, which may attack metal-organic coordination bonds and result in structural collapse of MOFs, thus hampering the practical applications of these MOFs [36]. Hence, understanding the chemical stability of chromium-based MOFs in the algal culture medium is essential when considering MOFs as flocculants for algal removal application. MIL-101 is a hybrid inorganic-organic crystalline material that is built up from trimers of Cr octahedral and terephthalic acid via coordination bonds [37]. MIL-101 was regarded as stable in acidic and neutral conditions, while the metal-organic skeleton may collapse in alkaline environments due to the hydrolyzation of trivalent chromium [37]. The stability of NH$_2$-MIL-101(Cr) in algal medium with different pH values was assessed from the viewpoint of Cr release in the algal culture medium. FIG. 5 shows the released Cr from metal-organic skeleton increased over time and reached 1.2±0.2%, 1.5±0.6%, and 2.3±0.7% after 6 h incubation in algal medium at pH 4.0, pH 7.0, and pH 10.0, respectively. Differences among the skeleton collapse ratio of NH$_2$-MIL-101(Cr) at various pH values were not statistically significant (p>0.05, ANOVA), indicating the stability of the MOFs in the current experimental constraints.

NH$_2$-MIL-101(Cr) possesses excellent thermal, chemical, and solvent stability, and is stable in air, water (both acidic and alkali solution), and most organic solvents, as well as at high temperature [37]. These properties allow it to be re-used as a catalyst or adsorbent for the removal of various environmental contaminants [19, 21, 37]. NH$_2$-MIL-101 (Cr) was directly re-used with minimal reduction of its pollutant removal efficiency after simple separation.

Mechanisms of *M. aeruginosa* Removal Via NH$_2$-MIL-101 (Cr)

Figure 6:
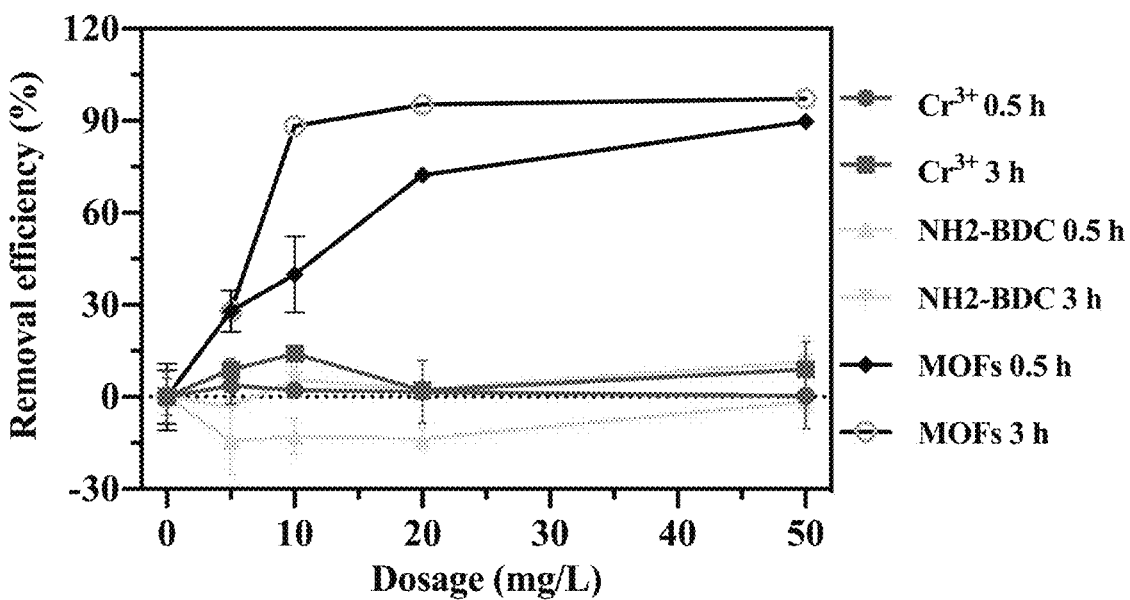
FIG. 6 depicts algae removal efficiency of $Cr^{3+}$ and $NH_2$-BDC in comparison with the Cr-based MOFs (experiment conditions: cell density=$6\times10^6$, pH value=$7.1\pm0.1$)

The algal removal performance of the organic linker (NH$_2$-BDC) and metal nodes (Cr(NO$_3$)$_3$), which were used for NH$_2$-MIL-101(Cr) synthesis, were evaluated and compared with that of the MOFs. No visually observable algae aggregation occurred after NH$_2$-BDC or Cr(NO$_3$)$_3$ addition. Through algal cell number quantification, NH$_2$-BDC and Cr(NO$_3$)$_3$ at 5-50 mg/L gave <5% and <15% algal removal efficiency within 0.5 h and 3 h, while Cr-MOFs gave as high as 90% and 97% removal efficiency under the identical conditions (FIG. 6). Thus, NH$_2$-BDC and Cr(NO$_3$)$_3$ showed negligible effects on *M. aeruginosa* removal compared with the Cr(III)-MOFs in all tested conditions. These results indicate that the algal removal effects mainly resulted from the intact MOFs materials.

Figure 7A:
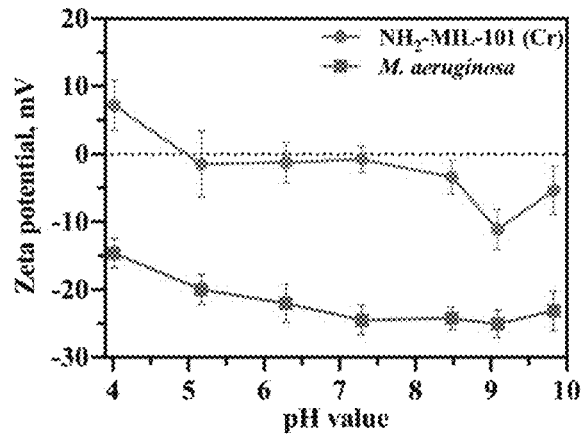
FIGS. 7A-7C depict the zeta potential of *M. aeruginosa* suspensions (FIG. 7A) at different pH values with 20 mg/L $NH_2$-MIL-101(Cr) (cell density: $6\times10^6$ cell/mL)
Figure 7B:
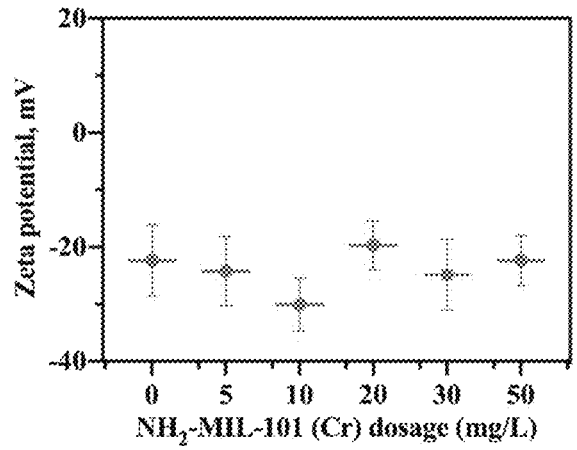
Figure 7C:
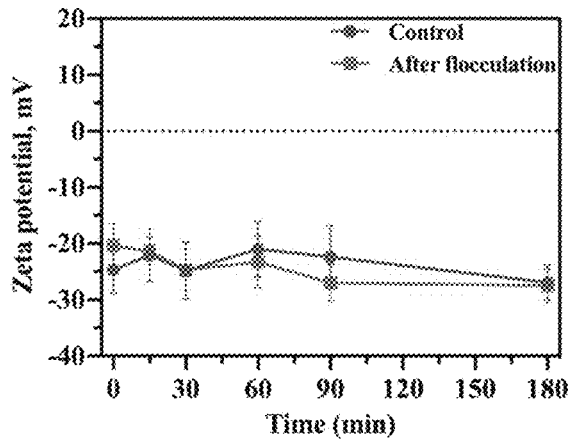

Algal flocculation may occur by several different mechanisms including charge neutralization, bridging, and sweep [11]. To investigate the mechanism of NH$_2$-MIL-101(Cr) mediated algal removal, zeta potential [3], a widely used indicator for quantification of algal surface charge, was monitored during the floc growth. The algae, without any MOFs addition, showed negative zeta potential within the pH range of 4-10 (FIG. 7A). The high negative surface charge ensured strong electrostatic repulsion among *M. aeruginosa* cells keeping them evenly dispersed in aquatic environment [38]. After 3 h incubation in the presence of different dosage of MOFs, the zeta potentials of algal solutions fluctuated but no statistical differences from the control were observed (FIG. 7B). The zeta potential changes of algal solutions during 3 h assay with NH$_2$-MIL-101(Cr) dosage fixed at 20 mg/L are depicted in FIG. 7C. The native *M. aeruginosa* cells showed stable zeta potential values through the 3-h test period, maintaining zeta potential values ranging from −21±5 to −27±3 mV. In comparison, with the addition of NH$_2$-MIL-101(Cr), the zeta potential of the algal solutions ranged from −20±4 to −27±3 mV, showing no significant difference (p>0.05) from those without NH$_2$-

MIL-101(Cr) treatment. Therefore, the efficient algal sedimentation and removal achieved with $NH_2$-MIL-101(Cr) was not significantly contributed by charge neutralization.

Figure 8A:
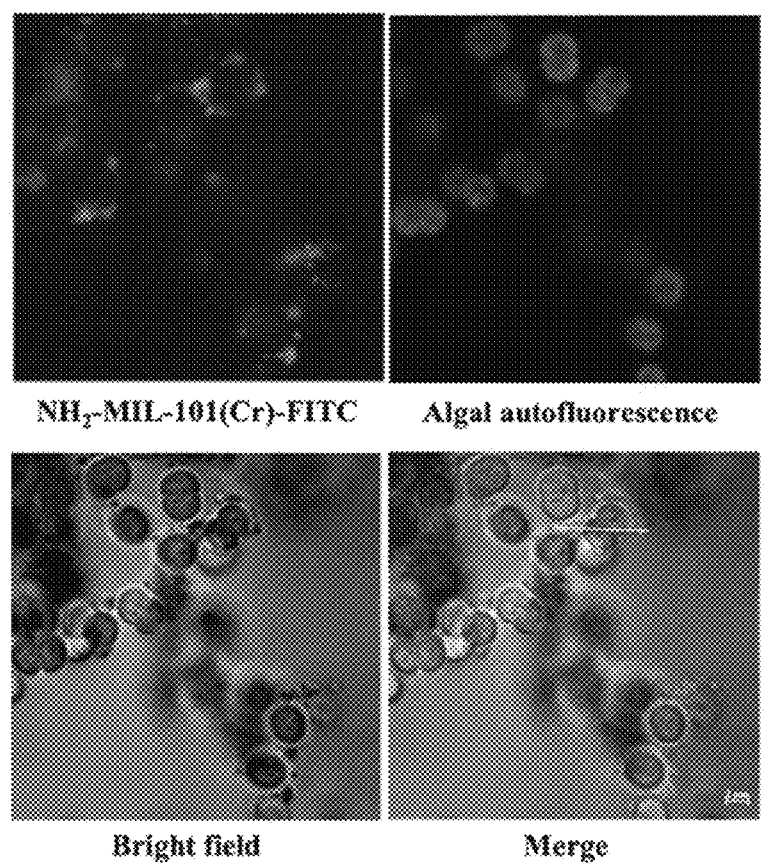
FIGS. 8A and 8B depict (FIG. 8A) representative confocal images of *M. aeruginosa* after treatment with $NH_2$-MIL-101(Cr)-FITC, where $NH_2$-MIL-101(Cr) was labeled with FITC (green channel) and autofluorescence of *M. aeruginosa* from chloroplasts was recorded in red channel.
Figure 8B:
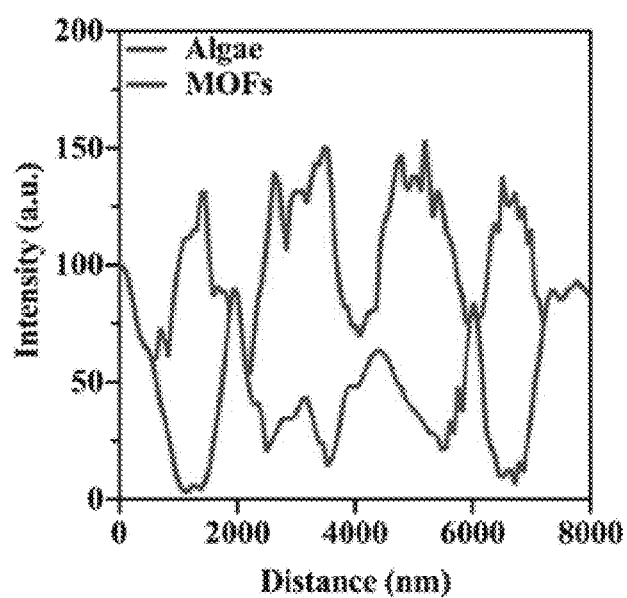
Figure 9:
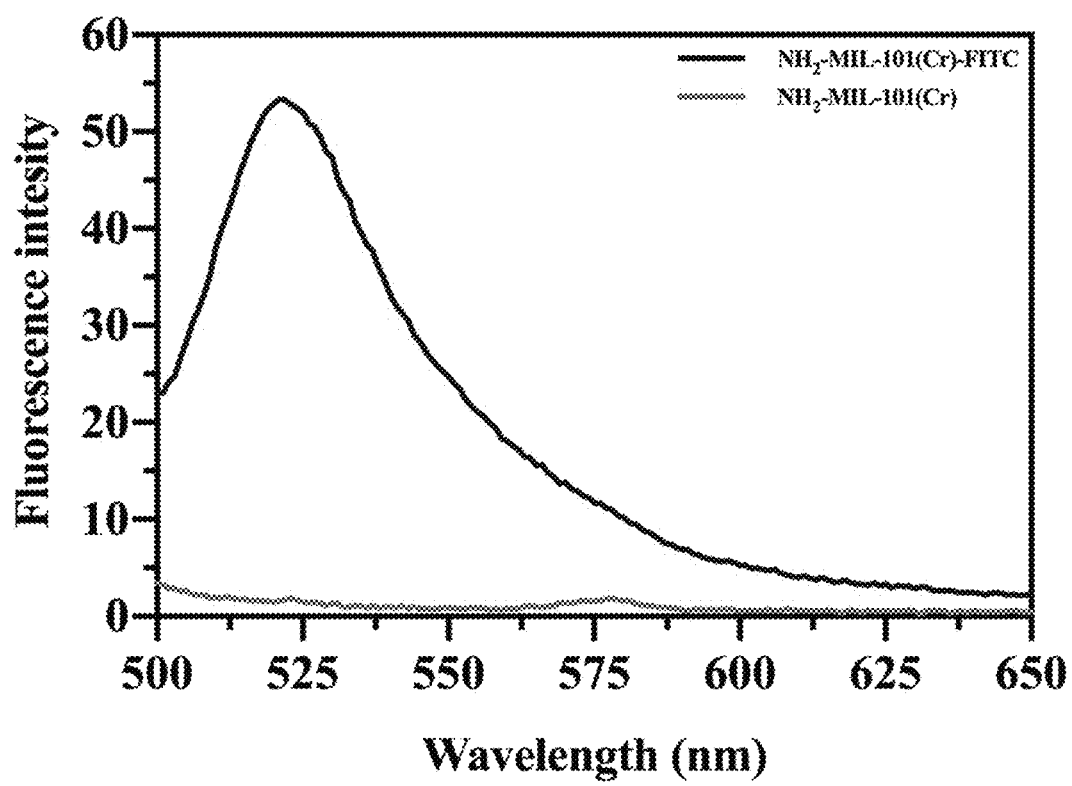
FIG. 9 depicts fluorescence spectroscopy results of $NH_2$-MIL-101 (Cr) and $NH_2$-MIL-101(Cr)-FITC (excitation: 480 nm; emission: 500-650 nm)
Figure 10A:
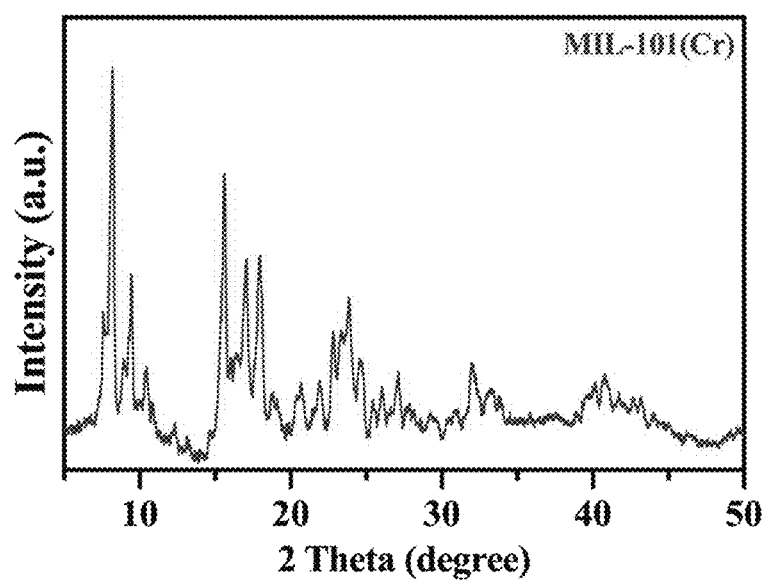
FIG. 10 depicts the hydrodynamic diameters of $NH_2$-MIL-101(Cr) obtained by Dynamic light scattering after the addition of $NH_2$-MIL-101(Cr) to BG11 medium with final concentration of 20 and 100 mg/L, respectively.
Figure 10B:
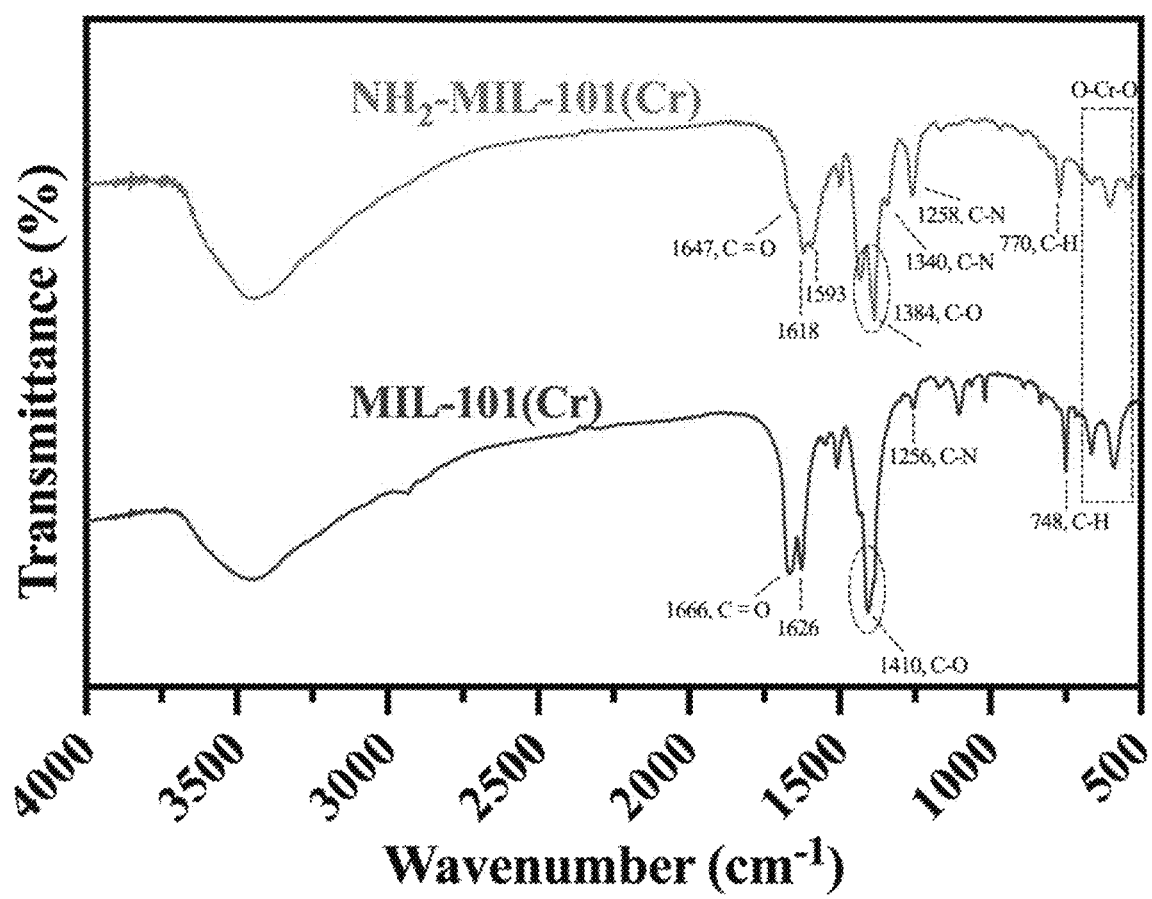
Figure 10C:
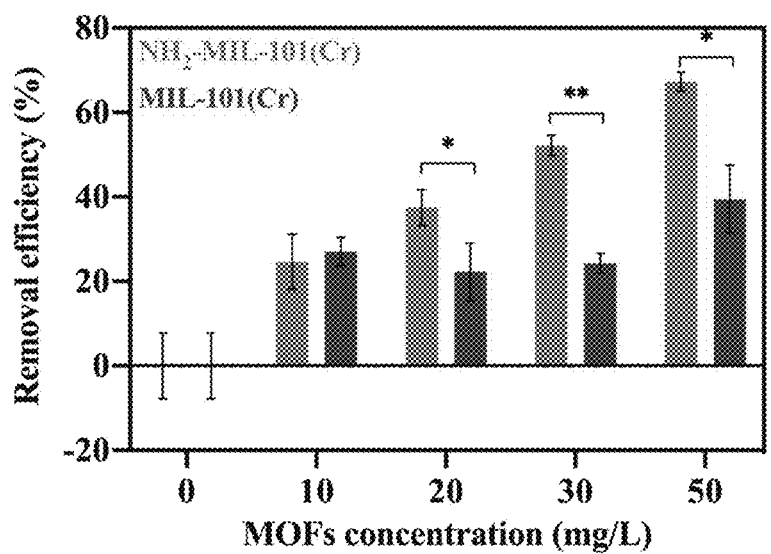

$NH_2$-MIL-101(Cr) was post-synthetically loaded with fluorescein 5(6)-isothiocyanate (FITC) by incubation with FITC in ethanol for 48 h, as described previously [39]. After the contact of algal cells with FITC-loaded MOFs, confocal laser scanning microscopy (ZEISS LSM-900) was carried out to further reveal the interactions of MOFs with cyanobacterial cells (FIG. 8). Successful FITC loading was validated by fluorescence spectroscopy (FIG. 9). The MOFs or MOFs aggregates could therefore be differentiated from the chlorophyll red fluorescence of algal cells using the fluorescent features of FITC, which allowed the MOFs' image to show up as green (FIG. 8A). The signal distribution of algal autofluorescence and $NH_2$-MIL-101(Cr)-FITC was analyzed and is shown in FIG. 8B, which demonstrates that no green fluorescence was visible inside the algal cells after they were incubated with $NH_2$-MIL-101(Cr)-FITC. It was believed that the MOFs aggregated and therefore were too large to penetrate through the cell wall (FIG. 10). Nevertheless, the whole cyanobacterial cells were completely coated by a layer of MOFs agglomerate (green fluorescence), forming large algae-nanoparticle flocs (FIG. 8A). The MOFs aggregated in the algal solution, attached onto the surface of cyanobacteria, and performed as the bridge for algal cells to connect with each other. Physical interactions between nanoparticles and algal cells have been revealed in previous studies. The aggregates of nano-ZnO were reported to attach and wrap the green algae *Chlorella* sp., which was considered as one mechanism responsible for the observed toxicity [40]. The toxic effects of $SiO_2$ nanoparticles on *Scenedesmus* algal cells were ascribed to the absorption of $SiO_2$ nanoparticles to the surface of algal cells [41].

Figure 12A:
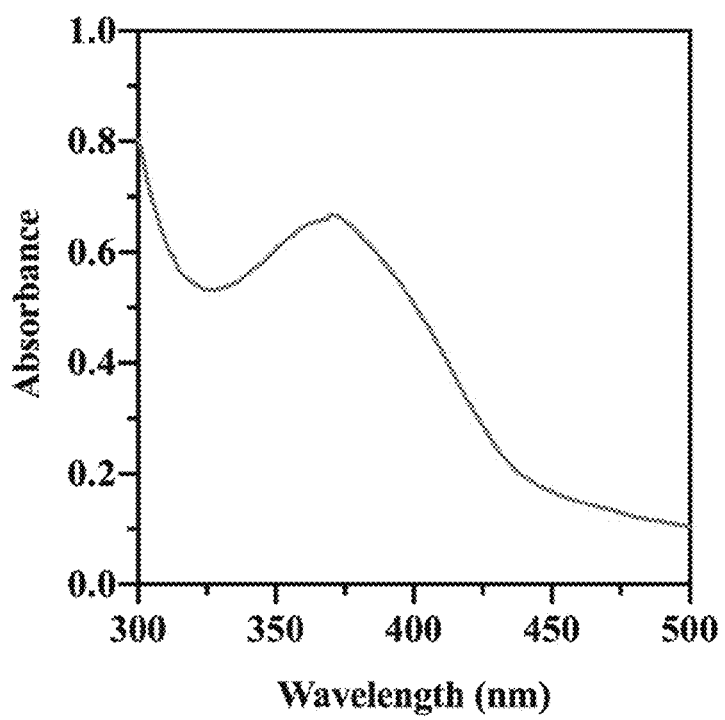
FIG. 12A depicts UV-Vis spectra of $NH_2$-MIL-101(Cr).
Figure 12B:
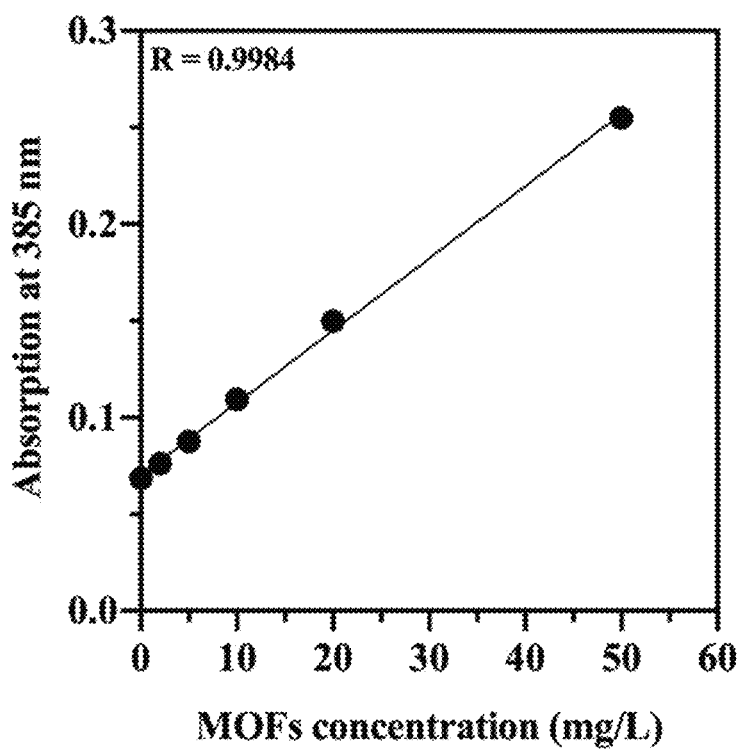
FIG. 12B depicts the relationship between the absorbance value at 385 nm and the concentrations of $NH_2$-MIL-101 (Cr) in the BG11 medium (the linear model-fitted result was illustrated as the black line)
Figure 12C:
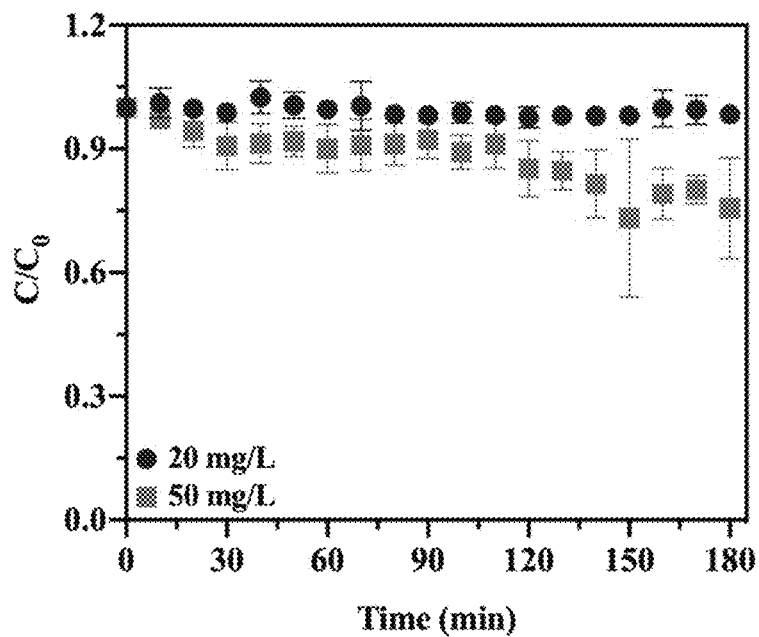
FIG. 12C depicts the sedimentation results of $NH_2$-MIL-101(Cr) in the BG11 medium at initial concentration of 20 and 50 mg/L, respectively.
Figure 13:
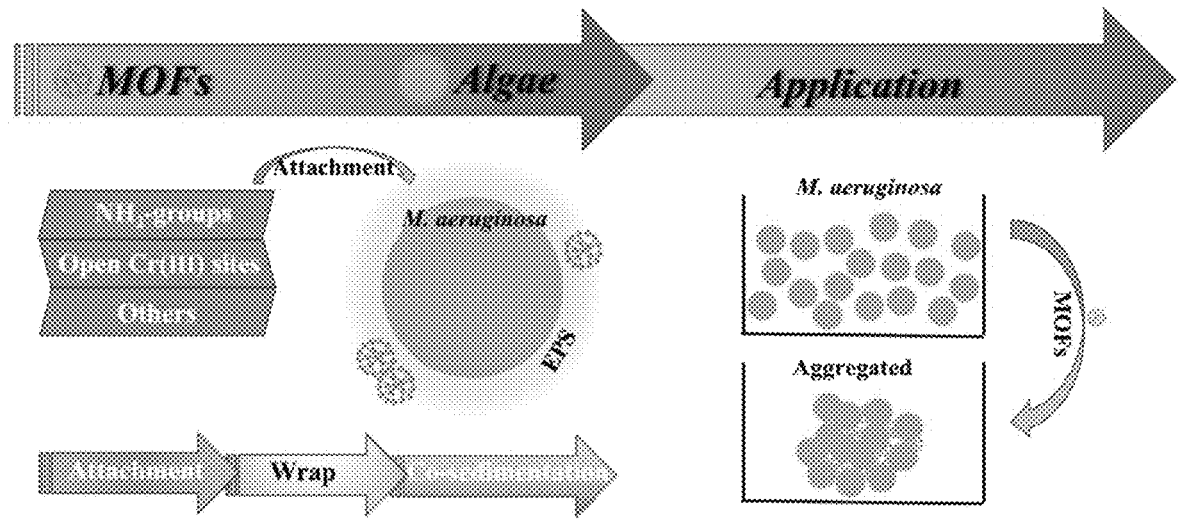
FIG. 13 depicts a scientific scheme of the design idea and the algal removal mechanisms.

Aggregation between MOFs (e.g., Al-based porphyrin MOFs and $NH_2$-MIL-125(Ti)) and *Chlamydomonas reinhardtii* was also observed in a previous study, whereas in the present examples the aggregates were smaller where large quantities of algal cells were free [25]. The stability and sedimentation of the MOFs in the algal medium were tested and the results are shown in FIGS. 12A-12C. The concentrations of suspended MOFs decreased by ~25% in 180 min at an initial concentration of 50 mg/L, but no decrease was detected at 20 mg/L. The present Cr-MOFs showed less sedimentation in algal medium than other types of MOFs (25% within 60 min for Al-based porphyrin MOFs and 25% within 30 min for Ni—Co-PYZ MOFs) as described previously [25]. The algal removal performance of $NH_2$-MIL-101(Cr) was probably due to its unique behaviors in aqueous environments, showing weaker settling than those of other MOFs. Such characteristic of $NH_2$-MIL-101(Cr) results in the contact of MOFs with *M. aeruginosa* cells for a greater length of time, finally facilitating the adhesion of more MOFs agglomerate to algae [42]. MOFs adhering to and subsequent co-precipitation with cyanobacteria from the solution may contribute to algal removal (FIG. 13). Algal removal efficiencies increased with increasing cell densities (FIG. 3B), likely due to the increased rate of encounter between cyanobacteria and MOFs [43].

Figure 11:
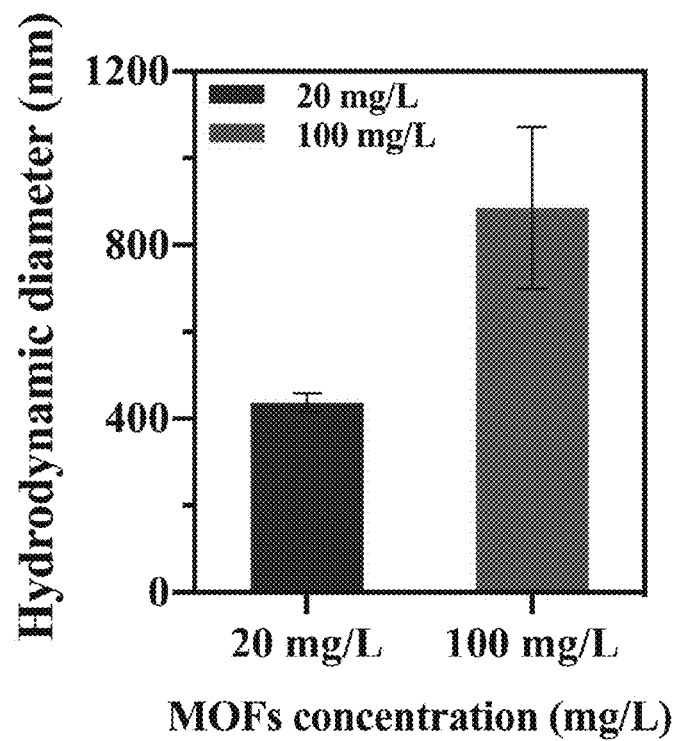
FIG. 11A depicts XRD results of MIL-101(Cr)
FIG. 11B depicts FTIR results of MIL-101(Cr)
FIG. 11C depicts *M. aeruginosa* removal performance via $NH_2$-MIL-101(Cr) and MIL-101(Cr)

The reactive $NH_2$— groups existing on the surface of $NH_2$-MIL-101(Cr) MOFs may increase versatility for covalent attachment to other functional species [32]. Thus, the performance of algal flocculation via $NH_2$-MIL-101(Cr) was compared to that of MIL-101(Cr), which did not contain any reactive $NH_2$— groups. The formation of MIL-101(Cr) was confirmed by the XRD pattern and FTIR spectrum (FIGS. 11A and 11B). FIG. 11C depicts the time dependence of the removal ratio of *M. aeruginosa* cells via different types of MOFs at various concentrations. It can be seen that $NH_2$-MIL-101(Cr) displayed higher algal removal performance than MIL-101(Cr) did. An amine group from the organic linker may have contributed to the enhanced algal removal performance by facilitating the bridging and trapping of algae cells.

Algal Integrity and Viability After $NH_2$-MIL-101(Cr) Treatment

Figure 14A:
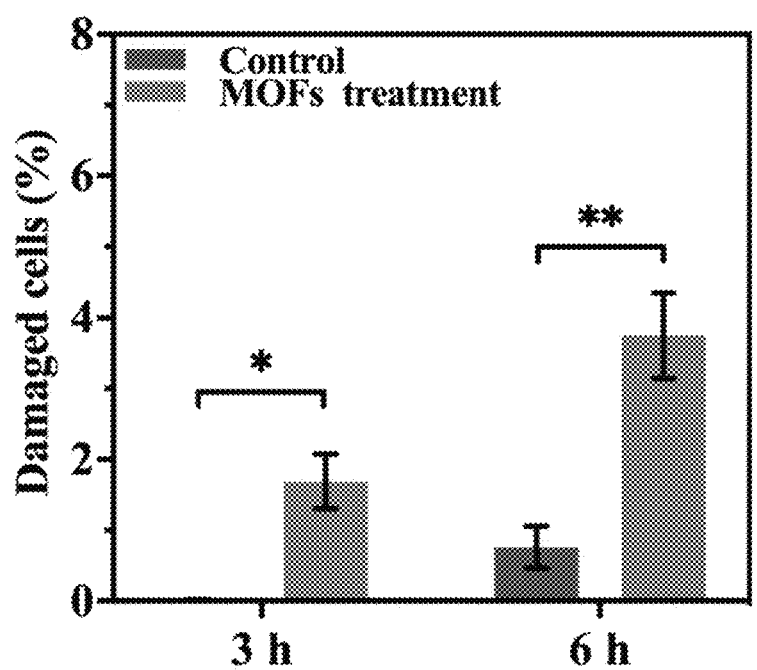
FIGS. 14A and 14B depict the result of treatment with 20 mg/L $NH_2$-MIL-101(Cr) for 3 and 6 h on (FIG. 14A) membranes of algal cells and (FIG. 14B) esterase activity of algal cells (*$p<0.05$; **$p<0.01$).
Figure 14B:
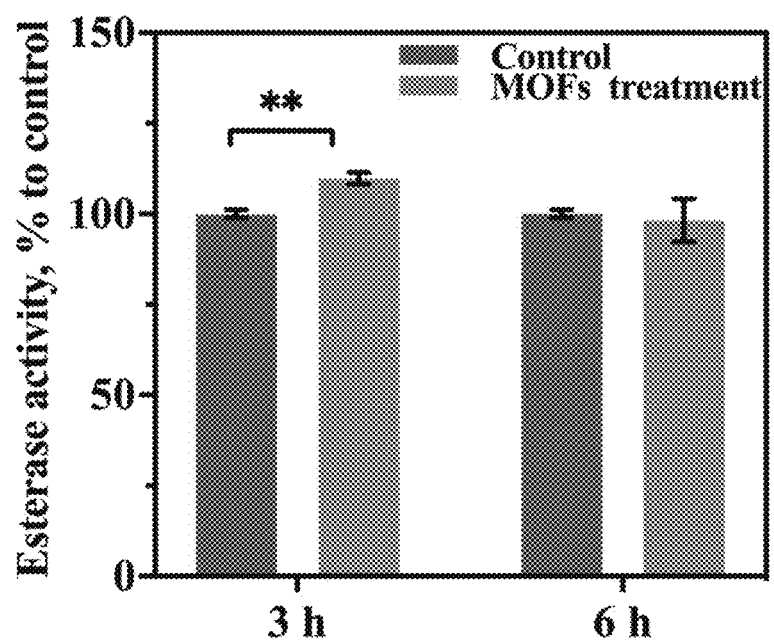

Conventionally, direct contact between nanoparticles and algal cells was thought to induce mechanical damage to the cell membrane and leakage of the cytoplasm [44]. Thus, during algal removal processes, *M. aeruginosa* cells might be destroyed, and large amounts of toxins would be released back into the water, which could cause secondary pollution. A lack of damage to microbes (e.g., *M. aeruginosa* cells) following flocculation with an MOF in accordance with aspects of the present disclosure is therefore surprising and advantageous. FIGS. 14A-14B illustrates the effects of $NH_2$-MIL-101(Cr) on *M. aeruginosa* cell damage, as indicated by the cell integrity and viability. PI, a fluorescent dye that can permeate the algae cells with damaged membranes, was applied to determine the ratios of damaged cells during algal removal process. The membrane integrity of *M. aeruginosa* cells was relatively unaffected by the $NH_2$-MIL-101(Cr) treatment, as only 2% and 4% of *M. aeruginosa* lost their membrane integrity within 3 h and 6 h, respectively (FIG. 14A). This was further demonstrated by the algal esterase activity results (FIG. 14B). Decreased cellular FDA fluorescence represented reduced enzyme activity or loss of cell membrane integrities. An increase ($p<0.05$) in the esterase enzymes activity was observed 3 h after $NH_2$-MIL-101(Cr) addition, which can be derived from the adaptation of algae to the stress caused by MOFs. *M. aeruginosa* cells in both the control and $NH_2$-MIL-101(Cr) treated groups showed smooth spherical surface. Therefore, the MOFs materials used allowed for algae removal without destroying the cell integrity and there was no risk of the release of intracellular toxins from the *M. aeruginosa*. MIL-101(Cr) as a bio-inert material was well tolerated by various organisms. For example, MIL-101(Cr) is non-toxic to both alveolar epithelial cells and macrophages at dosage up to 100 mg/L [45]. Further, MIL-101(Cr) at 1000 mg/kg caused no significant adverse effect in mice after a 28-day oral toxicity test [46].

Some classical series of MOFs were found to be able to inhibit the growth of algae, with 72-h $EC_{50}$ ranging from 1 to 50 mg/L [25]. Release of toxic metal ions, such as copper, nickel, and zinc, largely contributed to the algal inhibition [25, 47]. In such cases, high MOFs addition amount (dozens mg/L) and long treatment duration (several days) are required to achieve satisfactory efficiency. Moreover, leakage of heavy metals from MOFs will cause secondary metal pollution, which poses a threat to aquatic life. MOFs may also be used as photocatalyst for algae removal under visible light irradiation [21, 22, 47]. Light-triggered generation of reactive oxygen species were the major driving forces for the photocatalytic destruction of algae. MOFs modification is favorable to enhance their light adsorption and thereby photocatalytic performance [21, 22]. For example, ZIF-8 at 10 mg/L showed less than 10% of algal destruction effects after 6 h light irradiation, while that of modified ZIF-8, named as Ag/AgCl@ZIF-8, was 93% [22]. Destruction of algal cells results in exudation of algal toxins to the surrounding ecosystems, eventually posing a threat to aquatic biota. $NH_2$-MIL-101(Cr) can be directly used as a flocculant for the flocculation and sedimentation of *M. aeruginosa* without modification. $NH_2$-MIL-101(Cr) showed many advantages for harmful algae removal, such as much lower MOFs addition (<20 mg/L), short treatment time (≤1.5 h), negligible Cr(III) release (<3%), minimal algal damage (<5%), and easy to harvest by salvage.

MIL-101(Cr), including but not limited to $NH_2$-MIL-101 (Cr), showed high stability and capacity for cyanobacteria removal from water by flocculation, requiring low MOFs dosage and short treatment time, and sustaining broad ranges of pH and algal density conditions. Meanwhile, limited membrane damage and cell lysis was detected during algal removal assay, indicating that the risk of intracellular toxins being released is negligible. Moreover, after MOFs treatment, minimal algal re-growth occurred within 7 days, suggesting the long-term inhibitory effect of the MIL-101 (Cr) on *M. aeruginosa* growth. The applications of MOFs in environmental remediation are mainly focused on adsorptive removal of contaminants (e.g., toxic metals, organic pollutants, and toxic gases) and photocatalysis degradation of pollutants from water. The present disclosure, for the first time, demonstrates the potential of using MOFs material as flocculant for the treatment of HABs induced by *M. aeruginosa*.

A skilled person would appreciate that flocculation in accordance with aspects of the present disclosure would be effective in fresh water, brackish water, or salt water. Further, flocculation in accordance with aspects of the present disclosure would be effective in water with an average salinity of less than or equal to about 3%, including any and all ranges and subranges therein. In an example, flocculation in accordance with aspects of the present disclosure would be effective in a freshwater source, such as a river, pond, lake, or reservoir, to remove a microbe native to fresh water, e.g., having an average salinity of less than about 0.05%. Similarly, flocculation in accordance with the present invention would be effective in a brackish water source to remove a microbe native to brackish water, e.g., having an average salinity of from about 0.05% to about 3%. Moreover, flocculation in accordance with the present invention would be effective in a saltwater source to remove a microbe native to saltwater, e.g., having an average salinity of greater than about 3%.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or article that "comprises", "has", "includes" or "contains" one or more steps or elements possesses those one or more steps or elements, but is not limited to possessing only those one or more steps or elements. Likewise, a step of a method or an element of an article that "comprises", "has", "includes" or "contains" one or more features possesses those one or more features, but is not limited to possessing only those one or more features.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to an amount that is within ±10% of the recited value, an amount that is within ±5% of the recited value, less than or equal to ±2%, an amount that is within ±1% of the recited value, an amount that is within ±0.5% of the recited value, an amount that is within ±0.2% of the recited value, an amount that is within ±0.1% of the recited value, or an amount that is within ±0.05% of the recited value. In some instances, the approximating language may correspond to the precision of an instrument for measuring the value.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present disclosure have been described and depicted herein, alternative aspects and embodiments may be affected by persons having ordinary skill in the art to accomplish the same objectives. Accordingly, this disclosure and the appended claims are intended to cover all such further and alternative aspects and embodiments as fall within the true spirit and scope of the present disclosure.

REFERENCES

[1] J. Qi, H. Lan, R. Liu, H. Liu, J. Qu, Efficient *Microcystis aeruginosa* removal by moderate photocatalysis-enhanced coagulation with magnetic Zn-doped $Fe_3O_4$ particles, Water Res. 171 (2020) 115448.

[2] B. Marsalek, D. Jancula, E. Marsalkova, M. Mashlan, K. Safarova, J. Tucek, R. Zboril, Multimodal action and selective toxicity of zerovalent iron nanoparticles against cyanobacteria, Environ. Sci. Technol. 46(4) (2012) 2316-2323.

[3] L. Li, H. Zhang, G. Pan, Influence of zeta potential on the flocculation of cyanobacteria cells using chitosan modified soil, J. Environ. Sci. 28 (2015) 47-53.

[4] D. Vandamme, I. Foubert, K. Muylaert, Flocculation as a low-cost method for harvesting microalgae for bulk biomass production, Trends Biotechnol. 31(4) (2013) 233-239.

[5] M. Drikas, C. W. Chow, J. House, M. D. Burch, Using coagulation, flocculation, and settling to remove toxic cyanobacteria, J. Am. Water Work. Assoc. 93(2) (2001) 100-111.

[6] A. Schlesinger, D. Eisenstadt, A. Bar-Gil, H. Carmely, S. Einbinder, J. Gressel, Inexpensive non-toxic flocculation of microalgae contradicts theories; overcoming a major hurdle to bulk algal production, Biotechnol. Adv. 30(5) (2012) 1023-1030.

[7] E. S. Beach, M. J. Eckelman, Z. Cui, L. Brentner, J. B. Zimmerman, Preferential technological and life cycle environmental performance of chitosan flocculation for harvesting of the green algae *Neochloris oleoabundans*, Bioresour. Technol. 121 (2012) 445-449.

[8] N. B. Wyatt, L. M. Gloe, P. V. Brady, J. C. Hewson, A. M. Grillet, M. G. Hankins, P. I. Pohl, Critical conditions for ferric chloride-induced flocculation of freshwater algae, Biotechnol. Bioeng. 109(2) (2012) 493-501.

[9] D. M. Anderson, Turning back the harmful red tide, Nature 388(6642) (1997) 513-514.

[10] X. Jin, L. Bi, T. Lyu, J. Chen, H. Zhang, G. Pan, Amphoteric starch-based bicomponent modified soil for mitigation of harmful algal blooms (HABs) with broad salinity tolerance: Flocculation, algal regrowth, and ecological safety, Water Res. 165 (2019) 115005.

[11] M. Vermuë, G. Olivieri, L. van den Broek, M. Barbosa, M. Eppink, R. Wijffels, D. Kleinegris, Cationic polymers for successful flocculation of marine microalgae, Bioresour. Technol. 169 (2014) 804-807.

[12] J. Fan, Y.-B. Hu, X.-Y. Li, Nanoscale zero-valent iron coated with magnesium hydroxide for effective removal of cyanobacteria from water, ACS Sustain. Chem. Eng. 6(11) (2018) 15135-15142.

[13] L. Li, G. Pan, A universal method for flocculating harmful algal blooms in marine and fresh waters using modified sand, Environ. Sci. Technol. 47(9) (2013) 4555-4562.

[14] T. Wang, W.-L. Yang, Y. Hong, Y.-L. Hou, Magnetic nanoparticles grafted with amino-riched dendrimer as magnetic flocculant for efficient harvesting of oleaginous microalgae, Chem. Eng. J. 297 (2016) 304-314.

[15] C. Wan, M. A. Alam, X.-Q. Zhao, X.-Y. Zhang, S.-L. Guo, S.-H. Ho, J.-S. Chang, F.-W. Bai, Current progress and future prospect of microalgal biomass harvest using various flocculation technologies, Bioresour. Technol. 184 (2015) 251-257.

[16] Y. Mu, Z. Ai, L. Zhang, F. Song, Insight into core-shell dependent anoxic Cr(VI) removal with Fe@Fe$_2$O$_3$ nanowires: indispensable role of surface bound Fe(II), ACS Appl. Mater. Interfaces 7(3) (2015) 1997-2005.

[17] J. Fan, P. Hobson, L. Ho, R. Daly, J. Brookes, The effects of various control and water treatment processes on the membrane integrity and toxin fate of cyanobacteria, J. Hazard. Mater. 264 (2014) 313-322.

[18] B. Li, H. M. Wen, Y. Cui, W. Zhou, G. Qian, B. Chen, Emerging multifunctional metal-organic framework materials, Adv. Mater. 28(40) (2016) 8819-8860.

[19] S. Patial, P. Raizada, V. Hasija, P. Singh, V. K. Thakur, V.-H. Nguyen, Recent advances in photocatalytic multivariate metal organic framework (MOFs) based nanostructures toward renewable energy and the removal of environmental pollutants, Mater. Today Energy (2020) 100589.

[20] T. Zhang, G. V. Lowry, N. L. Capiro, J. Chen, W. Chen, Y. Chen, D. D. Dionysiou, D. W. Elliott, S. Ghoshal, T. Hofmann, In situ remediation of subsurface contamination: opportunities and challenges for nanotechnology and advanced materials, Environ. Sci. Nano 6(5) (2019) 1283-1302.

[21] X. Huang, Q. Liu, S. Yao, G. Jiang, Recent progress in the application of nanomaterials in the analysis of emerging chemical contaminants, Anal. Methods 9(19) (2017) 2768-2783.

[22] G. Fan, J. Zhou, X. Zheng, J. Luo, L. Hong, F. Qu, Fast photocatalytic inactivation of *Microcystis aeruginosa* by metal-organic frameworks under visible light, Chemosphere 239 (2020) 124721.

[23] J. Cui, S. Ren, B. Sun, S. Jia, Optimization protocols and improved strategies for metal-organic frameworks for immobilizing enzymes: Current development and future challenges, Coord. Chem. Rev. 370 (2018) 22-41.

[24] H. Furukawa, K. E. Cordova, M. O'Keeffe, O. M. Yaghi, The chemistry and applications of metal-organic frameworks, Science 341(6149) (2013).

[25] Y. Li, S. Shang, J. Shang, W.-X. Wang, Toxicity assessment and underlying mechanisms of multiple metal organic frameworks using the green algae *Chlamydomonas reinhardtii* model, Environ. Pollut. 291 (2021) 118199.

[26] G. Férey, C. Mellot-Draznieks, C. Serre, F. Millange, J. Dutour, S. Surblé, I. Margiolaki, A chromium terephthalate-based solid with unusually large pore volumes and surface area, Science 309(5743) (2005) 2040-2042.

[27] Y. Lin, C. Kong, L. Chen, Direct synthesis of amine-functionalized MIL-101(Cr) nanoparticles and application for CO$_2$ capture, RSC Adv. 2(16) (2012) 6417-6419.

[28] C. Gecgel, UB Simsek, B. Gozmen, M. Turabik, Comparison of MIL-101(Fe) and amine-functionalized MIL-101(Fe) as photocatalysts for the removal of imidacloprid in aqueous solution, J. Iran. Chem. Soc. 16(8) (2019) 1735-1748.

[29] N. Bouazizi, J. Vieillard, B. Samir, FL. Derf, Advances in amine-surface functionalization of inorganic adsorbents for water treatment and antimicrobial activities: a review, Polymers. 14(3) (2022) 378.

[30] A. M. Zayed, N. Terry, Chromium in the environment: factors affecting biological remediation, Plant Soil 249(1) (2003) 139-156.

[31] L. Hu, Y. Cai, G. Jiang, Occurrence and speciation of polymeric chromium(III), monomeric chromium(III) and chromium(VI) in environmental samples, Chemosphere 156 (2016) 14-20.

[32] X. Li, Y. Pi, Q. Xia, Z. Li, J. Xiao, TiO$_2$ encapsulated in Salicylaldehyde-NH$_2$-MIL-101(Cr) for enhanced visible light-driven photodegradation of MB, Appl. Catal. B-Environ. 191 (2016) 192-201.

[33] S. Bauer, C. Serre, T. Devic, P. Horcajada, J. Marrot, G. Férey, N. Stock, High-throughput assisted rationalization of the formation of metal organic frameworks in the iron(III) aminoterephthalate solvothermal system, Inorg. Chem. 47(17) (2008) 7568-7576.

[34] L. Wang, W. Liang, J. Yu, Z. Liang, L. Ruan, Y. Zhang, Flocculation of *Microcystis aeruginosa* using modified larch tannin, Environ. Sci. Technol. 47(11) (2013) 5771-5777.

[35] X. Zhang, B. Wang, A. Alsalme, S. Xiang, Z. Zhang, B. Chen, Design and applications of water-stable metal-organic frameworks: Status and challenges, Coord. Chem. Rev. 423 (2020) 213507.

[36] L. Feng, K.-Y. Wang, G. S. Day, M. R. Ryder, H.-C. Zhou, Destruction of metal-organic frameworks: positive and negative aspects of stability and lability, Chem. Rev. 120(23) (2020) 13087-13133.

[37] Q. Zhou, M. Lei, Y. Wu, Y. Yuan, Magnetic solid phase extraction of typical polycyclic aromatic hydrocarbons from environmental water samples with metal organic framework MIL-101(Cr) modified zero valent iron nanoparticles, J. Chromatogr. A 1487 (2017) 22-29.

[38] G. Fan, B. Du, J. Zhou, W. Yu, Z. Chen, S. Yang, Stable Ag$_2$O/g-C$_3$N$_4$ pn heterojunction photocatalysts for efficient inactivation of harmful algae under visible light, Appl. Catal. B-Environ. 265 (2020) 118610.

[39] F. M. Hinterholzinger, B. Rühle, S. Wuttke, K. Karaghiosoff, T. Bein, Highly sensitive and selective fluoride detection in water through fluorophore release from a metal-organic framework, Sci. Rep. 3(1) (2013) 1-7.

[40] J. Ji, Z. Long, D. Lin, Toxicity of oxide nanoparticles to the green algae *Chlorella* sp, Chem. Eng. J. 170(2-3) (2011) 525-530.

[41] C. Wei, Y. Zhang, J. Guo, B. Han, X. Yang, J. Yuan, Effects of silica nanoparticles on growth and photosynthetic pigment contents of *Scenedesmus obliquus*, J. Environ. Sci. 22(1) (2010) 155-160.

[42] M. Sendra, M. P. Yeste, J. M. Gatica, I. Moreno-Garrido, J. Blasco, Homoagglomeration and heteroagglomeration of $TiO_2$, in nanoparticle and bulk form, onto freshwater and marine microalgae, Sci. Total Environ. 592 (2017) 403-411.

[43] C. J. Dedman, M. M. Rizk, J. A. Christie-Oleza, G.-L. Davies, Investigating the impact of cerium oxide nanoparticles upon the ecologically significant marine cyanobacterium *Prochlorococcus*, Front. Mar. Sci. 8 (2021) 571.

[44] F. Schwab, T. D. Bucheli, L. P. Lukhele, A. Magrez, B. Nowack, L. Sigg, K. Knauer, Are carbon nanotube effects on green algae caused by shading and agglomeration?, Environ. Sci. Technol. 45(14) (2011) 6136-6144.

[45] S. Wuttke, A. Zimpel, T. Bein, S. Braig, K. Stoiber, A. Vollmar, D. Müller, K. Haastert-Talini, J. Schaeske, M. Stiesch, Validating metal-organic framework nanoparticles for their nanosafety in diverse biomedical applications, Adv. Health. Mater. 6(2) (2017) 1600818.

[46] C.-H. Liu, H.-C. Chiu, H.-L. Sung, J.-Y. Yeh, K. C.-W. Wu, S.-H. Liu, Acute oral toxicity and repeated dose 28-day oral toxicity studies of MIL-101 nanoparticles, Regul. Toxicol. Pharm. 107 (2019) 104426.

[47] X. He, P. Wu, S. Wang, A. Wang, C. Wang, P. Ding, Inactivation of harmful algae using photocatalysts: Mechanisms and performance, J. Clean. Prod. 289 (2021) 125755.

What is claimed is:

1. A method of flocculation, comprising
adding a metal-organic framework to an aqueous solution, wherein the metal-organic framework comprises chromium, and
wherein the aqueous solution comprises a microbe.

2. The method of claim 1, wherein the metal-organic framework comprises MIL-101(Cr).

3. The method of claim 2, wherein the metal-organic framework comprises an amine-functionalized MIL-101 (Cr).

4. The method of claim 3, wherein the amine-functionalized MIL-101(Cr) is $NH_2$-MIL-101(Cr).

5. The method of claim 4, wherein adding a metal-organic framework to an aqueous solution comprises a sufficient mass of metal-organic framework to create a local concentration of aqueous metal-organic framework of from about 5 mg/L to about 50 mg/mL for from about 30 minutes to about 360 minutes.

6. The method of claim 5, wherein the aqueous solution comprises a freshwater source, a saltwater source, or a brackish water source.

7. The method of claim 6, wherein the aqueous solution comprises a freshwater source.

8. The method of claim 7, wherein the freshwater source is a pond, a lake, or a reservoir.

9. The method of claim 8, wherein the microbe is selected from an algae, a bacterium, a fungus, an archaea, a protozoan, and a virus.

10. The method of claim 9, wherein the microbe is a bacterium.

11. The method of claim 10, wherein the bacterium is a cyanobacterium.

12. The method of claim 11, wherein the cyanobacterium is *Microcystis aeruginosa*.

13. The method of claim 9, wherein the microbe is an algae.

14. The method of claim 13, wherein the algae is *Chlamydomonas reinhardtii* or *Chlorella pyrenoidosa*.

15. The method of claim 14, wherein the algae is *Chlamydomonas reinhardtii*.

16. The method of claim 14, wherein the algae is *Chlorella pyrenoidosa*.

17. The method of claim 6, wherein the aqueous solution comprises a saltwater source or a brackish water source.

18. The method of claim 17, wherein the aqueous solution has an average salinity of from about 1.5% to about 3%.

19. The method of claim 18, wherein the microbe is selected from an algae, a bacterium, a fungus, an archaea, a protozoan, and a virus.

20. The method of claim 19, wherein the microbe is a bacterium.

21. The method of claim 20, wherein the bacterium is a cyanobacterium.

22. The method of claim 21, wherein the cyanobacterium is *Microcystis aeruginosa*.

* * * * *